(12) United States Patent
Ishigaki et al.

(10) Patent No.: US 9,895,980 B2
(45) Date of Patent: Feb. 20, 2018

(54) POWER SUPPLY SYSTEM

(71) Applicant: TOYOTA JIDOSHA KABUSHIKI KAISHA, Toyota-shi, Aichi-ken (JP)

(72) Inventors: Masanori Ishigaki, Nagakute (JP); Shuji Tomura, Nagakute (JP); Naoki Yanagizawa, Nagakute (JP); Masaki Okamura, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 241 days.

(21) Appl. No.: 14/897,754

(22) PCT Filed: Jun. 12, 2014

(86) PCT No.: PCT/JP2014/065559
§ 371 (c)(1),
(2) Date: Dec. 11, 2015

(87) PCT Pub. No.: WO2014/200049
PCT Pub. Date: Dec. 18, 2014

(65) Prior Publication Data
US 2016/0137069 A1 May 19, 2016

(30) Foreign Application Priority Data
Jun. 13, 2013 (JP) .................................. 2013-124617

(51) Int. Cl.
*B60L 11/02* (2006.01)
*B60L 11/18* (2006.01)
(Continued)

(52) U.S. Cl.
CPC ................ *B60L 11/02* (2013.01); *B60L 7/14* (2013.01); *B60L 11/005* (2013.01); *B60L 11/18* (2013.01);
(Continued)

(58) Field of Classification Search
CPC ...... B60L 11/02; B60L 11/1809; B60L 11/18; B60L 15/2009; B60L 11/1803;
(Continued)

(56) References Cited

U.S. PATENT DOCUMENTS

| 5,479,083 A * | 12/1995 | Brainard ........... H01M 10/0413 320/121 |
| 2014/0145694 A1* | 5/2014 | Ishigaki .................... H02J 1/06 323/271 |
| 2016/0001660 A1* | 1/2016 | Tomura ..................... H02J 1/00 307/10.1 |

FOREIGN PATENT DOCUMENTS

| DE | 10138983 A1 | 2/2003 |
| DE | 112014001669 T5 | 12/2015 |

(Continued)

*Primary Examiner* — Jared Fureman
*Assistant Examiner* — Michael Warmflash
(74) *Attorney, Agent, or Firm* — Andrews Kurth Kenyon LLP

(57) ABSTRACT

A power converter has a series direct connection mode of keeping on/off of a plurality of switching elements to maintain the state where first and second DC power supplies different in amount of voltage change with respect to input/output of the same amount of electric power are connected in series with an electric power line connected to a load, and a voltage controlling mode of controlling an output voltage on the electric power line to be a voltage command value by controlling on/off of the plurality of switching elements. In the voltage controlling mode, between time tx and ta, the sum of voltages of the first and second DC power supplies is matched with the voltage command value by controlling the output voltage by means of charging/discharging between the first and second DC power supplies. After time ta, the series direct connection mode is applied.

9 Claims, 19 Drawing Sheets

(51) Int. Cl.
- *H02M 7/44* (2006.01)
- *H02J 5/00* (2016.01)
- *B60L 7/14* (2006.01)
- *B60L 11/00* (2006.01)
- *B60L 15/20* (2006.01)
- *H02M 3/158* (2006.01)
- *H02J 7/00* (2006.01)
- *H02M 3/155* (2006.01)

(52) U.S. Cl.
CPC ....... *B60L 11/1803* (2013.01); *B60L 11/1809* (2013.01); *B60L 11/1853* (2013.01); *B60L 11/1859* (2013.01); *B60L 11/1861* (2013.01); *B60L 11/1864* (2013.01); *B60L 15/2009* (2013.01); *H02J 5/00* (2013.01); *H02J 7/0016* (2013.01); *H02J 7/0065* (2013.01); *H02M 3/155* (2013.01); *H02M 3/158* (2013.01); *H02M 7/44* (2013.01); *B60L 2210/10* (2013.01); *B60L 2220/14* (2013.01); *B60L 2240/12* (2013.01); *B60L 2240/421* (2013.01); *B60L 2240/423* (2013.01); *B60L 2240/545* (2013.01); *B60L 2240/547* (2013.01); *B60L 2240/549* (2013.01); *Y02T 10/645* (2013.01); *Y02T 10/7005* (2013.01); *Y02T 10/7022* (2013.01); *Y02T 10/7044* (2013.01); *Y02T 10/7055* (2013.01); *Y02T 10/7061* (2013.01); *Y02T 10/7216* (2013.01); *Y02T 10/7275* (2013.01)

(58) Field of Classification Search
CPC .... B60L 7/14; B60L 11/1861; B60L 11/1864; B60L 11/1859; B60L 11/1853; B60L 11/005; H02J 5/00; H02J 7/0016; H02J 7/0065; H02M 7/44; H02M 3/155; H02M 3/158

See application file for complete search history.

(56) References Cited

FOREIGN PATENT DOCUMENTS

| | | |
|---|---|---|
| JP | 2010-057288 A | 3/2010 |
| JP | 2012-070514 A | 4/2012 |
| JP | 2013013234 A | 1/2013 |
| WO | 2012/039131 A2 | 3/2012 |

* cited by examiner

| OPERATION MODE | USED POWER SUPPLY | OUTPUT VOLTAGE | S1 | S2 | S3 | S4 |
|---|---|---|---|---|---|---|
| PB | 10a AND 10b (IN PARALLEL) | VH→VH* | PWM CONTROL | | | |
| SB | 10a AND 10b (IN SERIES) | VH→VH* | PWM CONTROL | | | |
| aB | ONLY 10a | VH→VH* | PWM CONTROL | | | |
| bB | ONLY 10b | VH→VH* | PWM CONTROL | | | |
| PD | 10a AND 10b | VH=Va=Vb | ON | ON | OFF | ON |
| SD | 10a AND 10b | VH=Va+Vb | ON | OFF | ON | OFF |
| aD | ONLY 10a | VH=Va (Va>Vb) | ON | ON | OFF | OFF |
| bD | ONLY 10b | VH=Vb (Vb>Va) | ON | OFF | OFF | ON |

| | OPERATIONAL EXPRESSION |
|---|---|
| SG1 | /SDa or /SDb |
| SG2 | /SDa or SDb |
| SG3 | SDa or SDb |
| SG4 | SDa or /SDb |

| | OPERATIONAL EXPRESSION |
|---|---|
| SG1 | /SDc |
| SG2 | SDc |
| SG3 | KEPT AT H |
| SG4 | SDc |

| OPERATION MODE | POWER DISTRIBUTION RATIO k | VH SETTABLE RANGE |
|---|---|---|
| PB | CONTROLLABLE | $\max(Va,Vb) \sim VHmax$ |
| SB | $\dfrac{Va}{Va+Vb}$ | $Va+Vb \sim VHmax$ |
| aB | 1.0 | $\max(Va,Vb) \sim VHmax$ |
| bB | 0 | $\max(Va,Vb) \sim VHmax$ |
| PD | $\dfrac{Rb}{Ra+Rb}$ | $=Va(=Vb)$ |
| SD | $\dfrac{Va}{Va+Vb}$ | $=Va+Vb$ |
| aD | 1.0 | $=Va$ |
| bD | 0 | $=Vb$ |

|  | DURING ACCELERATION | DURING DECELERATION |
|---|---|---|
| $VH > Va+Vb$ | POWER CIRCULATION (PB) (10a→10b FOR CHARGE 10b) | UTILIZE TRAVELING LOAD (PB or bB) (DISCHARGE 10b) |
| $VH < Va+Vb$ | UTILIZE TRAVELING LOAD (PB or bB) (DISCHARGE 10b) | POWER CIRCULATION (PB) (10b→10a FOR DISCHARGE 10b) |

POWER SUPPLY SYSTEM

CROSS-REFERENCE TO RELATED APPLICATIONS

This is a national phase application based on the PCT International Patent Application No. PCT/JP2014/065559 filed Jun. 12, 2014, claiming priority to Japanese Patent Application No. 2013-124617 filed Jun. 13, 2013, the entire contents of both of which are incorporated herein by reference.

TECHNICAL FIELD

The present invention relates to a power supply system, and more particularly to controlling a power supply system configured to include a power converter connected across a plurality of DC power supplies and an electric power line.

BACKGROUND ART

A power supply device in which a plurality of power supplies are combined to supply power to a load is described in, for example, Japanese Patent Laying-Open No. 2010-57288 (PTD 1). The power supply device described in PTD 1 is provided with a switch for switching between series connection and parallel connection of a first power storage unit and a second power storage unit.

PTD 1 describes controlling the power supply device to switch between series connection and parallel connection based on driving power requested by a load, the difference between maximum supply power and total loss in each of a parallel connection state and a series connection state, as well as total loss. Thereby provided is a power supply device capable of achieving request driving power as much as possible in all usage conditions of the load, while reducing total loss to improve mutual efficiency.

Japanese Patent Laying-Open No. 2012-70514 (PTD 2) describes a configuration of a power converter capable of, by means of controlling of a plurality of switching elements, switching between an operation mode of carrying out DC/DC conversion with two DC power supplies connected in series (series connection mode) and an operation mode of carrying out DC/DC conversion with the two DC power supplies used in parallel (parallel connection mode).

CITATION LIST

Patent Document

PTD 1: Japanese Patent Laying-Open No. 2010-57288
PTD 2: Japanese Patent Laying-Open No. 2012-70514

SUMMARY OF INVENTION

Technical Problem

The power supply system described in PTD 1 is capable of switching between the parallel connection state and series connection state of two power storage units, but has no voltage control function (boosting function) between the power storage units and an electric power line to which the load is connected. Hence, a sufficient voltage for the load may be unable to be supplied at the time when a supply voltage decreases. Therefore, it is actually difficult to flexibly switch the connection mode of power storage units in pursuit of efficiency.

PTD 2 describes a power converter having a plurality of operation modes. However, PTD 2 fails to describe in detail specific processing for selecting among these operation modes. In the power converter described in PTD 2, the range of a voltage that the power converter can output varies in accordance with an operation mode. Thus, in consideration of this point, it is preferable to control a power supply system such that an advantageous operation mode in terms of efficiency can be selected.

The present invention was made to solve such a problem, and an object of the present invention is, in a power supply system configured such that a power converter connected across a plurality of DC power supplies and an electric power line has a plurality of operation modes, to control selection of an operation mode so as to improve efficiency of the whole system.

Solution to Problem

In an aspect of the present invention, a power supply system is configured to include a load, an electric power line connected to the load, a plurality of DC power supplies, a power converter connected across the plurality of DC power supplies and the electric power line, and a control device configured to control operation of the power converter. The plurality of DC power supplies include a first DC power supply and a second DC power supply different in amount of voltage change with respect to input/output of a same amount of energy. The power converter includes a plurality of switching elements and is configured to control an output voltage on the electric power line by operating with one operation mode being selectively applied among a plurality of operation modes different in a manner of power conversion between the plurality of DC power supplies and the electric power line. The plurality of operation modes include a series direct connection mode and a voltage controlling mode. In the series direct connection mode, the power converter operates to keep on/off of the plurality of switching elements such that the state where the plurality of DC power supplies are connected in series with the electric power line is maintained. In the voltage controlling mode, the power converter operates to control on/off of the plurality of switching elements to control the output voltage in accordance with a voltage command value by DC voltage conversion between at least one of the first and second DC power supplies and the electric power line. The control device includes a voltage adjustment control unit. The voltage adjustment control unit, in the voltage controlling mode, controls the DC voltage conversion performed by the power converter so as to execute voltage adjustment control for matching the sum of voltages of the plurality of DC power supplies with the voltage command value.

Preferably, in a case where the amount of voltage change in the second DC power supply is larger than the amount of voltage change in the first DC power supply with respect to input/output of the same amount of energy, when the sum of voltages of the plurality of DC power supplies is lower than the output voltage, the voltage adjustment control unit executes the voltage adjustment control by controlling the DC voltage conversion performed by the power converter such that the first DC power supply is discharged while the second DC power supply is charged.

Alternatively, preferably, in a case where the amount of voltage change in the second DC power supply is larger than the amount of voltage change in the first DC power supply with respect to input/output of the same amount of energy, when the sum of voltages of the plurality of DC power supplies is higher than the output voltage, the voltage adjustment control unit executes the voltage adjustment control by controlling the DC voltage conversion performed by the power converter such that the second DC power supply is discharged while the first DC power supply is charged.

Moreover, preferably, in a case where the amount of voltage change in the second DC power supply is larger than the amount of voltage change in the first DC power supply with respect to input/output of the same amount of energy, in a case where the sum of voltages of the plurality of DC power supplies is lower than the output voltage, when regenerative power is supplied from the load, the voltage adjustment control unit executes the voltage adjustment control by controlling the DC voltage conversion performed by the power converter such that electric power for charging the second DC power supply is higher than electric power for charging the first DC power supply.

Alternatively, preferably, in a case where the amount of voltage change in the second DC power supply is larger than the amount of voltage change in the first DC power supply with respect to input/output of the same amount of energy, in a case where the sum of voltages of the plurality of DC power supplies is higher than the output voltage, when electric power for powering is supplied to the load, the voltage adjustment control unit executes the voltage adjustment control by controlling the DC voltage conversion performed by the power converter such that electric power discharged from the second DC power supply is higher than electric power discharged from the first DC power supply.

Preferably, the control device further includes a mode selection unit. The mode selection unit further includes a mode selection unit configured to, when the difference between the sum of voltages of the plurality of DC power supplies and the output voltage falls below a determination value in the voltage controlling mode, perform switching to the series direct connection mode among the operation modes.

Moreover, preferably, the power supply system is mounted on an electric-powered vehicle. The load includes an electric motor configured to generate vehicle driving force for the electric-powered vehicle. The voltage adjustment control unit switches between execution and non-execution of the voltage adjustment control in accordance with a traveling situation of the electric-powered vehicle.

More preferably, the voltage adjustment control unit switches between execution and non-execution of the voltage adjustment control in accordance with prediction of a duration of high-speed cruising during high-speed traveling of the electric-powered vehicle.

Alternatively, preferably, in a case where the sum of voltages of the plurality of DC power supplies is higher than the output voltage, the voltage adjustment control unit executes the voltage adjustment control irrespective of the traveling situation of the electric-powered vehicle.

Preferably, the plurality of switching elements have first to fourth switching elements. The first switching element is electrically connected across a first node and the electric power line. The second switching element is electrically connected across a second node and the first node. The third switching element is electrically connected across a third node, electrically connected to a negative electrode terminal of the second DC power supply, and the second node. The fourth switching element is electrically connected across a negative electrode terminal of the first DC power supply and the third node. The power converter further has first and second reactors. The first reactor is electrically connected across the second node and a positive electrode terminal of the first DC power supply. The second reactor is electrically connected across the first node and a positive electrode terminal of the second DC power supply. The plurality of operation modes include first to third modes. In the first mode, the power converter operates to execute DC voltage conversion in parallel between the first and second DC power supplies and the electric power line by controlling on/off of the first to fourth switching elements. In the second mode, the power converter operates to execute DC voltage conversion between one of the first and second DC power supplies and the electric power line by controlling on/off of the first to fourth switching elements. In the third mode, the power converter operates to keep on/off of the first to fourth switching elements to maintain the state where the first and second DC power supplies are connected in series with the electric power line. The series direct connection mode is the third mode, and the voltage controlling mode is the first or second mode.

More preferably, the plurality of operation modes further include a fourth mode. In the fourth mode, the power converter operates to execute DC voltage conversion between the first and second DC power supplies connected in series and the electric power line by keeping the third switching element on and controlling on/off of the first, second and fourth switching elements. In the fourth mode, the voltage command value is set at a voltage higher than the sum of voltages of the plurality of DC power supplies.

More preferably, the plurality of operation modes further include fifth and sixth modes. In the fifth mode, the power converter operates to keep on/off of the first to fourth switching elements to maintain the state where one of the first and second DC power supplies is electrically connected to the electric power line and the other one of the first and second DC power supplies is electrically disconnected from the electric power line. In the sixth mode, the power converter operates to keep on/off of the first to fourth switching elements to maintain the state where the first and second DC power supplies are connected in parallel with the electric power line.

Advantageous Effects of Invention

According to the present invention, in a power supply system configured such that a power converter connected across a plurality of DC power supplies and an electric power line has a plurality of operation modes, selection of an operation mode can be controlled so as to improve efficiency of the whole system.

DESCRIPTION OF EMBODIMENTS

Figure 1:
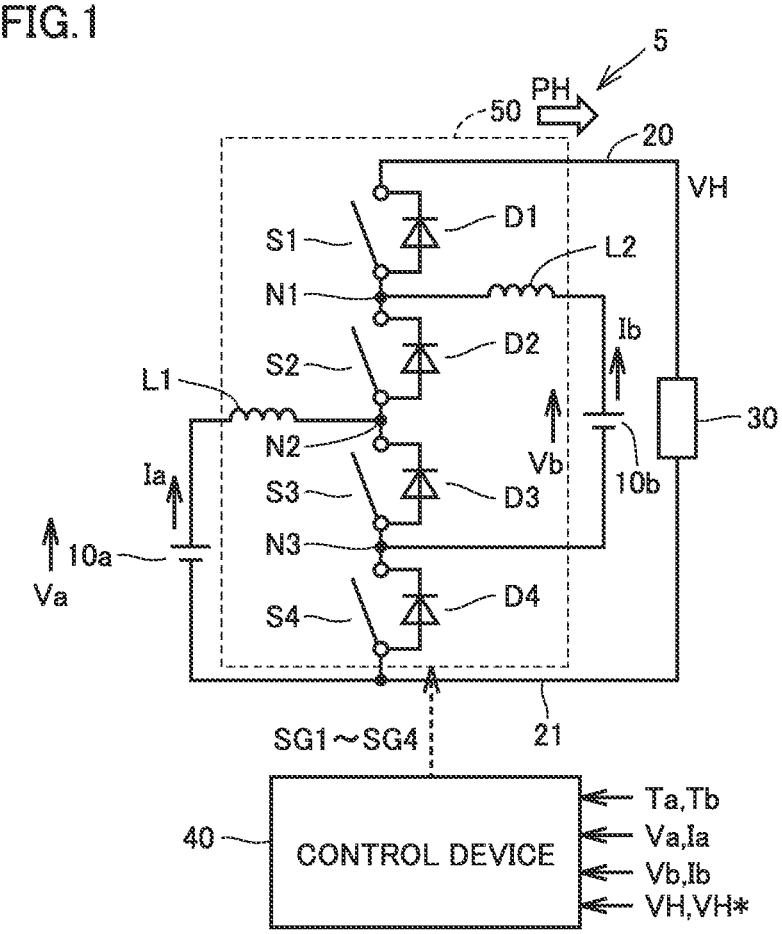
FIG. 1 is a circuit diagram showing a configuration of a power supply system including a power converter according to a first embodiment of the present invention.

Hereinbelow, embodiments of the present invention will be described in detail with reference to the drawings. It is noted that the same or corresponding portions in the drawings have the same reference characters allotted, and description thereof will basically not be repeated.

First Embodiment (Circuit Configuration of Power Converter)

FIG. 1 is a circuit diagram showing a configuration of a power supply system including a power converter according to a first embodiment of the present invention.

Referring to FIG. 1, a power supply system 5 includes a plurality of DC power supplies 10a and 10b, a load 30, and a power converter 50.

In the present embodiment, DC power supplies 10a and 10b are each implemented by a secondary battery, such as a lithium-ion secondary battery or a nickel-metal hydride battery, or a DC voltage source element having excellent output characteristics, such as an electric double layer capacitor or a lithium-ion capacitor.

Power converter 50 is connected across DC power supplies 10a, 10b and an electric power line 20. Power converter 50 controls a DC voltage on electric power line 20 (hereinafter also referred to as an output voltage VH) connected to load 30 in accordance with a voltage command value VH*. That is, electric power line 20 is provided in common for DC power supplies 10a and 10b.

Load 30 operates upon receipt of output voltage VH of power converter 50. Voltage command value VH* is set at a voltage suitable for the operation of load 30. Furthermore, load 30 may be configured to be capable of generating electric power for charging DC power supplies 10a and 10b by regenerative power generation or the like.

Power converter 50 includes switching elements S1 to S4 as well as reactors L1 and L2. In the present embodiment, for the switching elements, IGBTs (Insulated Gate Bipolar Transistors), power MOS (Metal Oxide Semiconductor) transistors, power bipolar transistors, or the like can be used. For switching elements S1 to S4, antiparallel diodes D1 to D4 are arranged, respectively. On/off of switching elements S1 to S4 can be controlled in response to control signals SG1 to SG4, respectively. That is, switching elements S1 to S4 are respectively turned on when control signals SG1 to SG4 are at a high level (hereinafter referred to as an H level), and are turned off when they are at a low level (hereinafter referred to as an L level).

Switching element S1 is electrically connected across electric power line 20 and a node N1. Reactor L2 is connected across node N1 and a positive electrode terminal of DC power supply 10b. Switching element S2 is electrically connected across nodes N1 and N2. Reactor L1 is connected across node N2 and a positive electrode terminal of DC power supply 10a.

Switching element S3 is electrically connected across nodes N2 and N3. Node N3 is electrically connected to a negative electrode terminal of DC power supply 10b. Switching element S4 is electrically connected across node N3 and a ground line 21. Ground line 21 is electrically connected to load 30 and a negative electrode terminal of DC power supply 10a.

As understood from FIG. 1, power converter 50 is configured to include a boost chopper circuit in correspondence with each of DC power supplies 10a and 10b. That is, for DC power supply 10a, a bidirectional current first boost chopper circuit is formed in which switching elements S1 and S2 serve as upper arm elements and switching elements S3 and S4 serve as lower arm elements. Similarly, for DC power supply 10b, a bidirectional current second boost chopper circuit is formed in which switching elements S1 and S4 serve as upper arm elements and switching elements S2 and S3 serve as lower arm elements.

Switching elements S1 to S4 are included in both of a power conversion path formed across DC power supply 10a and electric power line 20 by the first boost chopper circuit and a power conversion path formed across DC power supply 10b and electric power line 20 by the second boost chopper circuit.

Control device 40 is implemented by, for example, an electronic control unit (ECU) including a CPU (Central Processing Unit) and a memory neither shown, and is configured to perform arithmetic processing through use of a detection value of each sensor based on maps and programs stored in that memory. Alternatively, at least part of control device 40 may be configured to execute predetermined numeric/logic operation processing by hardware, such as an electronic circuit.

Control device 40 generates control signals SG1 to SG4 for controlling on/off of switching elements S1 to S4, respectively, in order to control output voltage VH to load 30. It is noted that although not shown in FIG. 1, detectors (voltage sensors, current sensors) for the voltage (hereinafter referred to as Va) and electric current (hereinafter referred to as Ia) of DC power supply 10a, the voltage (hereinafter referred to as Vb) and electric current (hereinafter referred to as Ib) of DC power supply 10b, as well as output voltage VH are provided. Furthermore, detectors (temperature sensors) for the temperatures (hereinafter referred to as Ta and Tb) of DC power supplies 10a and 10b are also preferably provided. The outputs of these detectors are given to control device 40.

In the configuration of FIG. 1, switching elements S1 to S4 correspond to "a first switching element" to "a fourth switching element", respectively, and reactors L1 and L2 correspond to "a first reactor" and "a second reactor", respectively.

Figure 2:
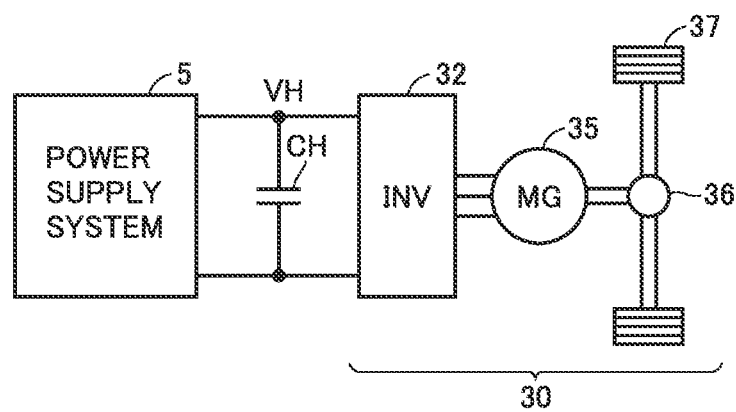
FIG. 2 is a schematic view showing an exemplary configuration of a load shown in FIG. 1.

FIG. 2 is a schematic view showing an exemplary configuration of load 30. Referring to FIG. 2, load 30 is configured to include a traction motor for an electric-powered vehicle, for example. Load 30 includes a smoothing capacitor CH, an inverter 32, a motor-generator 35, a motive power transmission gear 36, and a driving wheel 37.

Motor-generator 35 is a traction motor for generating vehicle driving force, and implemented by, for example, a multiple-phase permanent-magnet type synchronous motor. Output torque of motor-generator 35 is transferred to driving wheel 37 by way of motive power transmission gear 36 formed by a reduction gear and a power split device. The electric-powered vehicle travels with the torque transferred to driving wheel 37. Motor-generator 35 generates electric power with rotary force of driving wheel 37 during regenerative braking of the electric-powered vehicle. This generated power is subjected to AC/DC conversion by inverter 32. This DC power can be used as electric power for charging DC power supplies 10a and 10b included in power supply system 5.

In a hybrid vehicle equipped with an engine (not shown) in addition to the motor-generator, vehicle driving force necessary for the electric-powered vehicle is generated by operating this engine and motor-generator 35 cooperatively. On this occasion, it is also possible to charge DC power supplies 10a and 10b with electric power generated by rotation of the engine.

In this manner, the electric-powered vehicle collectively represents vehicles equipped with a traction motor, and includes both of a hybrid vehicle that generates vehicle driving force by an engine and an electric motor, as well as an electric vehicle and a fuel-cell vehicle not equipped with an engine.

The operation of load 30 (motor-generator 35) is controlled such that required vehicle driving force or vehicle breaking force is obtained in accordance with the traveling condition of the electric-powered vehicle (representatively, the vehicular speed) and a driver's operation (representatively, operations on an accelerator pedal and a brake pedal). That is, the operation command for load 30 (e.g., torque command value for motor-generator 35) is set by traveling control on the electric-powered vehicle. The traveling control is preferably executed by a higher-level ECU different from control device 40 (FIG. 1).

(Operation Mode in Power Converter)

Power converter 50 has a plurality of operation modes different in a manner of DC power conversion between DC power supplies 10a, 10b and electric power line 20.

Figures 3, 4:
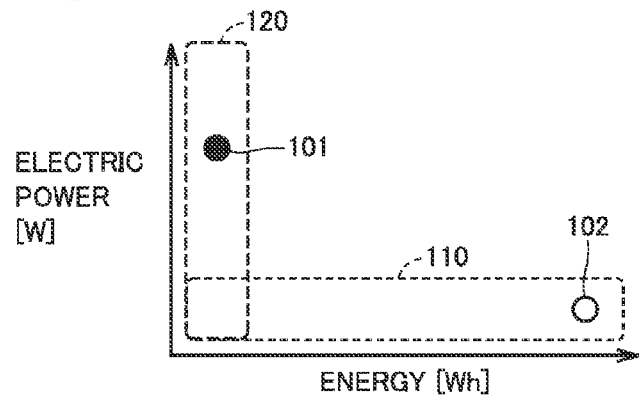
FIG. 3 is a table for describing a plurality of operation modes possessed by the power converter shown in FIG. 1.
FIG. 4 is a conceptual view showing an example of properties of two DC power supplies shown in FIG. 1 when implemented by power supplies of different types.

FIG. 3 shows a plurality of operation modes possessed by power converter 50.

Referring to FIG. 3, the operation modes are roughly divided into a "boosting mode (B)" of boosting output voltage(s) of DC power supply 10a and/or DC power supply 10b following periodic on/off control of switching elements S1 to S4 and a "direct connection mode (D)" of electrically connecting DC power supply 10a and/or DC power supply 10b to electric power line 20 with switching elements S1 to S4 kept on/off.

The boosting mode includes a "parallel boosting mode (hereinafter referred to as a PB mode)" of performing parallel DC/DC conversion between DC power supplies 10a, 10b and electric power line 20 and a "series boosting mode (hereinafter referred to as an SB mode)" of performing DC/DC conversion between DC power supplies 10a and 10b connected in series and electric power line 20. The PB mode corresponds to the "parallel connection mode" in PTD 2, and the SB mode corresponds to the "series connection mode" in PTD 2.

The boosting mode further includes an "independent mode with DC power supply 10a (hereinafter referred to as an aB mode)" of carrying out DC/DC conversion between only DC power supply 10a and electric power line 20 and an "independent mode with DC power supply 10b (hereinafter referred to as a bB mode)" of carrying out DC/DC conversion between only DC power supply 10b and electric power line 20. In the aB mode, DC power supply 10b is unused while being maintained in the state electrically disconnected from electric power line 20 as long as output voltage VH is controlled to be higher than voltage Vb of DC power supply 10b. Similarly, in the bB mode, DC power supply 10a is unused while being maintained in the state electrically disconnected from electric power line 20 as long as output voltage VH is controlled to be higher than voltage Va of DC power supply 10a.

In each of the PB mode, SB mode, aB mode, and bB mode included in the boosting mode, output voltage VH of electric power line 20 is controlled in accordance with voltage command value VH*. Control of switching elements S1 to S4 in each of these modes will be described later.

The direct connection mode includes a "parallel direct connection mode (hereinafter referred to as a PD mode)" of maintaining the state in which DC power supplies 10a and 10b are connected in parallel with electric power line 20 and a "series direct connection mode (hereinafter referred to as an SD mode)" of maintaining the state in which DC power supplies 10a and 10b are connected in series with electric power line 20.

In the PD mode, switching elements S1, S2 and S4 are kept on, while switching element S3 is kept off. Accordingly, output voltage VH becomes equivalent to output voltages Va, Vb of DC power supplies 10a, 10b (strictly, a higher one of Va and Vb). Since the voltage difference between Va and Vb will produce a short-circuit current at DC power supplies 10a and 10b, the PD mode can be applied limitedly when the voltage difference is small.

In the SD mode, switching elements S2 and S4 are kept off, while switching elements S1 and S3 are kept on. Accordingly, output voltage VH is determined uniquely in accordance with the sum of output voltages Va and Vb of DC power supplies 10a and 10b (VH=Va+Vb).

Further, the direct connection mode includes a "direct connection mode of DC power supply 10a (hereinafter referred to as an aD mode)" of electrically connecting only DC power supply 10a to electric power line 20 and a "direct connection mode of DC power supply 10b (hereinafter referred to as a bD mode)" of electrically connecting only DC power supply 10b to electric power line 20.

In the aD mode, switching elements S1 and S2 are kept on, while switching elements S3 and S4 are kept off. Accordingly, DC power supply 10b is brought into the state disconnected from electric power line 20, and output voltage VH becomes equivalent to voltage Va of DC power supply 10a (VH=Va). In the aD mode, DC power supply 10b is unused while being maintained in the state electrically disconnected from electric power line 20. It is noted that if the aD mode is applied when Vb>Va holds, a short-circuit current will flow from DC power supply 10b to 10a by way of switching element S2. Thus, Va>Vb is a necessary requirement for applying the aD mode.

Similarly, in the bD mode, switching elements S1 and S4 are kept on, while switching elements S2 and S3 are kept off. Accordingly, DC power supply 10a is brought into the state disconnected from electric power line 20, and output voltage VH becomes equivalent to voltage Vb of DC power supply 10b (VH=Vb). In the bD mode, DC power supply 10a is unused while being maintained in the state electrically disconnected from electric power line 20. It is noted that when the bD mode is applied when Va>Vb holds, a short-circuit current will flow from DC power supply 10a to 10b by way of diode D2. Thus, Vb>Va is a necessary requirement for applying the bD mode.

In each of the PD mode, SD mode, aD mode, and bD mode included in the direct connection mode, output voltage VH of electric power line 20 is determined depending on voltages Va and Vb of DC power supplies 10a and 10b, and therefore, cannot be directly controlled. Thus, in each mode included in the direct connection mode, output voltage VH can no longer be set at a voltage suitable for the operation of load 30, so that power loss of load 30 may be increased.

On the other hand, in the direct connection mode, power loss of power converter 50 is significantly suppressed because switching elements S1 to S4 are not turned on/off. Therefore, depending on the operating condition of load 30, there is a possibility that power loss of power supply system 5 as a whole can be suppressed because the amount of decrease in power loss of power converter 50 becomes larger than the amount of increase in power loss of load 30 by applying the direct connection mode.

In FIG. 3, the SD mode corresponds to the "series direct connection mode" in power converter 50, and each of the aB mode, the bB mode and the PB mode corresponds to the "voltage controlling mode" in power converter 50. The SD mode corresponds to the "first mode", the PB mode corresponds to the "second mode", and the aB mode and the bB mode correspond to the "third mode." The SB mode corresponds to the "fourth mode", the aD mode and the bD mode correspond to the "fifth mode", and the PD mode corresponds to the "sixth mode."

FIG. 4 is a conceptual view showing an example of properties of DC power supplies 10a and 10b when implemented by power supplies of different types. FIG. 4 shows a so-called Ragone plot in which energy is plotted on the horizontal axis and electric power is plotted on the vertical axis. In general, output power and stored energy of a DC power supply have a trade-off relationship. Therefore, a high output is difficult to obtain with a high-capacity type battery, while stored energy is difficult to increase with a high-output type battery.

Therefore, preferably, one of DC power supplies 10a and 10b is implemented by a so-called high-capacity type power supply having high stored energy, and the other one of them is implemented by a so-called high-output type power supply providing high output power. Then, energy stored in the high-capacity type power supply is used as a constant supply for a long time, and the high-output type power supply can be used as a buffer to output a shortage caused by the high-capacity type power supply.

In the example of FIG. 4, DC power supply 10a is implemented by a high-capacity type power supply, while DC power supply 10b is implemented by a high-output type power supply. Therefore, an active region 110 of DC power supply 10a has a narrower range of electric power that can be output than an active region 120 of DC power supply 10b. On the other hand, active region 120 has a narrower range of energy that can be stored than active region 110.

At an operating point 101 of load 30, high power is requested for a short time. For example, in an electric-powered vehicle, operating point 101 corresponds to abrupt acceleration caused by a user's accelerator operation. In contrast to this, at an operating point 102 of load 30, relatively low power is requested for a long time. For example, in an electric-powered vehicle, operating point 102 corresponds to continuous high-speed steady traveling.

To operating point 101, the output from high-output type DC power supply 10b can mainly be applied. On the other hand, to operating point 102, the output from high-capacity type DC power supply 10a can mainly be applied. Accordingly, in an electric-powered vehicle, the traveling distance with electrical energy can be extended through use of energy stored in the high-capacity type battery for a long time, and acceleration performance in correspondence with a user's accelerator operation can be ensured promptly.

When the DC power supplies are implemented by batteries, there are possibilities that output characteristics decrease at a low temperature and charging/discharging is restricted at a high temperature in order to suppress progress of deterioration. Particularly in an electric-powered vehicle, a case arises in which a temperature difference occurs between DC power supplies 10a and 10b because of the difference in mounting position. Therefore, in power supply system 5, there is a case in which it is more effective to use only either one of the DC power supplies in accordance with the operation condition (particularly, the temperature) of DC power supplies 10a and 10b or in accordance with requests of load 30 as described above. These cases can be handled by providing modes of using only one of DC power supplies 10a and 10b (aB mode, bB mode, aD mode, and bD mode) as described above.

That is, in power converter 50 according to the present first embodiment, any operation mode is selected from among the plurality of operation modes shown in FIG. 3 in accordance with the operation conditions of DC power supplies 10a, 10b and/or load 30. The details of processing for selecting an operation mode will be described later.

In this manner, by combining DC power supplies of different types and capacitances, stored energy can be used effectively in the whole system taking advantage of characteristics of the respective DC power supplies. Particularly in the present embodiment, DC power supplies 10a and 10b shall be configured to differ in amount of voltage changes with respect to input/output of the same energy (amount of electric power).

For example, in the present embodiment, an example in which DC power supply 10a is implemented by a secondary battery and DC power supply 10b is implemented by a capacitor having a capacity (full charge capacity) smaller than that of the secondary battery will be described. Therefore, the following description will be given assuming that the amount of voltage change in DC power supply 10b is larger than the amount of voltage change in DC power supply 10a with respect to charging/discharging of the same amount of electric power. That is, DC power supply 10a corresponds to the "first DC power supply", and DC power supply 10b corresponds to the "second DC power supply."

It is noted that DC power supplies 10a and 10b can also be implemented by DC power supplies of the same capacitance and the same type. Even in such a case, DC power supplies 10a and 10b can be configured such that the amount of voltage change with respect to charging/discharging of the same amount of electric power is different when the connection mode (series/parallel) of units is changed.

(Circuit Operation in Each Operation Mode)

Next, a circuit operation of power converter 50 in each operation mode will be described. First, a circuit operation in the PB mode of carrying out parallel DC/DC conversion between DC power supplies 10a, 10b and electric power line 20 will be described with reference to FIGS. 5 to 8.

(Circuit Operation in PB Mode)

Figure 5A:
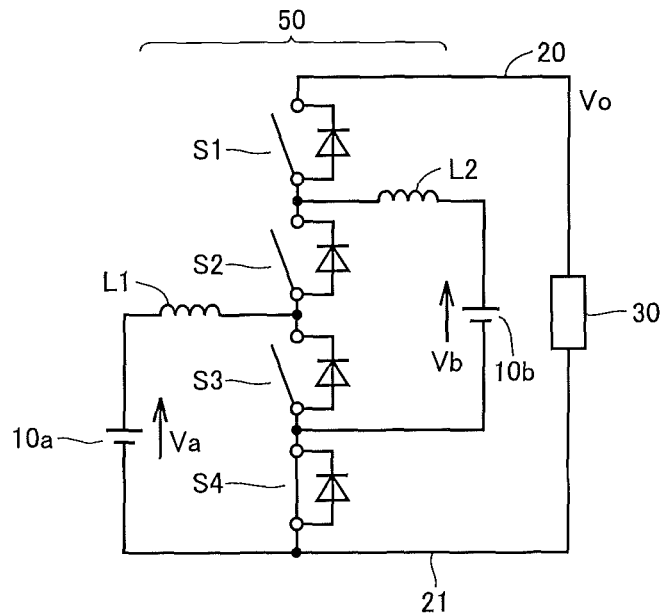
FIGS. 5(a) and 5(b) include circuit diagrams describing a first circuit operation in a PB mode.
Figure 5B:
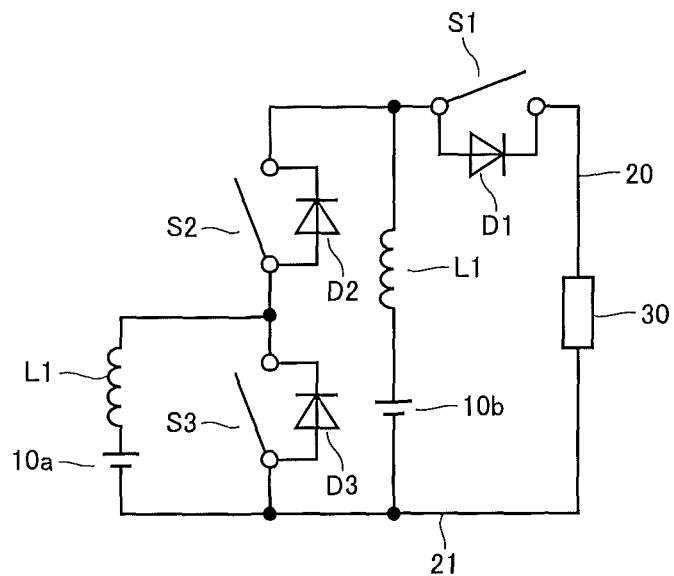
Figure 6A:
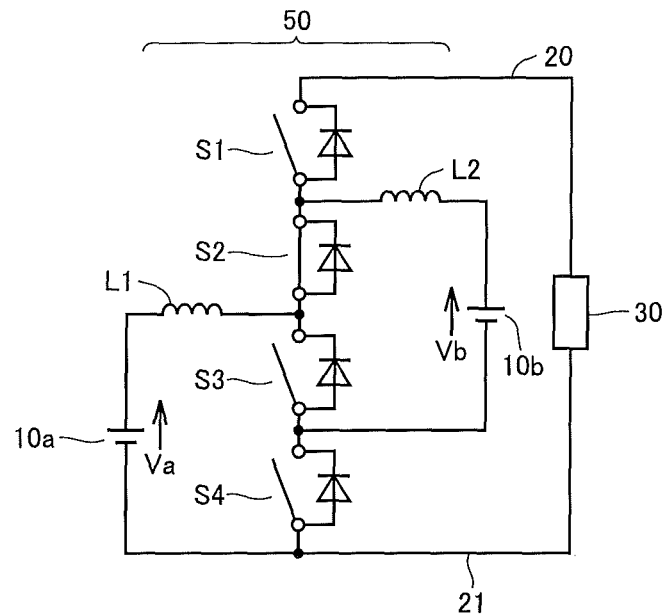
FIGS. 6(a) and 6(b) include circuit diagrams describing a second circuit operation in the PB mode.
Figure 6B:
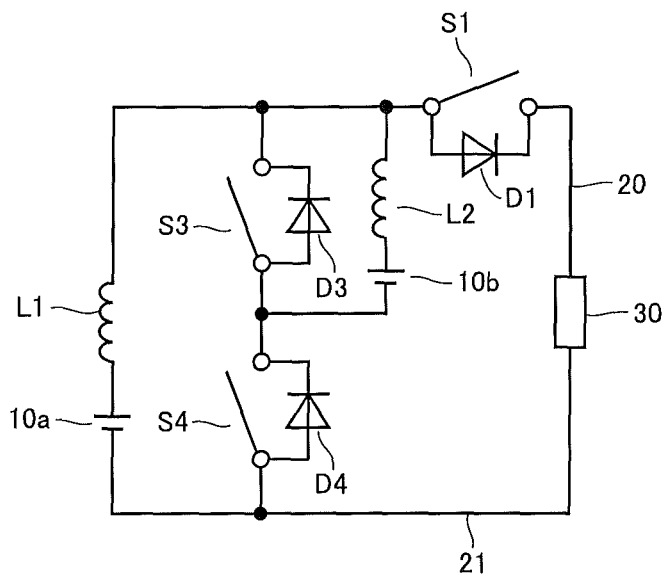

As shown in FIGS. 5 and 6, by turning on switching element S4 or S2, it is possible to connect DC power supplies 10a and 10b in parallel with electric power line 20. Here, in the parallel connection mode, the equivalent circuit will differ depending on which is higher between voltage Va of DC power supply 10a and voltage Vb of DC power supply 10b.

As shown at (a) of FIG. 5, when Vb>Va holds, by turning on switching element S4, DC power supplies 10a and 10b are connected in parallel through switching elements S2 and S3. The equivalent circuit at this time is as shown at (b) of FIG. 5.

Referring to (b) of FIG. 5, between DC power supply 10a and electric power line 20, by on/off control of switching element S3, the on- and off-periods of the lower arm element can be formed alternately. Similarly, between DC power supply 10b and electric power line 20, by common on/off control of switching elements S2 and S3, the on- and off-periods of the lower arm element of the boost chopper circuit can be formed alternately. Switching element S1 operates as a switch for controlling regeneration from load 30.

On the other hand, as shown at (a) of FIG. 6, when Va>Vb holds, by turning on switching element S2, DC power supplies 10a and 10b are connected in parallel through switching elements S3 and S4. The equivalent circuit at this time is as shown at (b) of FIG. 6.

Referring to (b) of FIG. 6, between DC power supply 10b and electric power line 20, by on/off control of switching element S3, the on- and off-periods of the lower arm element can be formed alternately. Similarly, between DC power supply 10a and electric power line 20, by common on/off control of switching elements S3 and S4, the on- and off-periods of the lower arm element of the boost chopper circuit can be formed alternately. Switching element S1 operates as a switch for controlling regeneration from load 30.

Next, referring to FIGS. 7 and 8, the boost operation in the PB mode of power converter 50 will be described in detail.

Figure 7A:
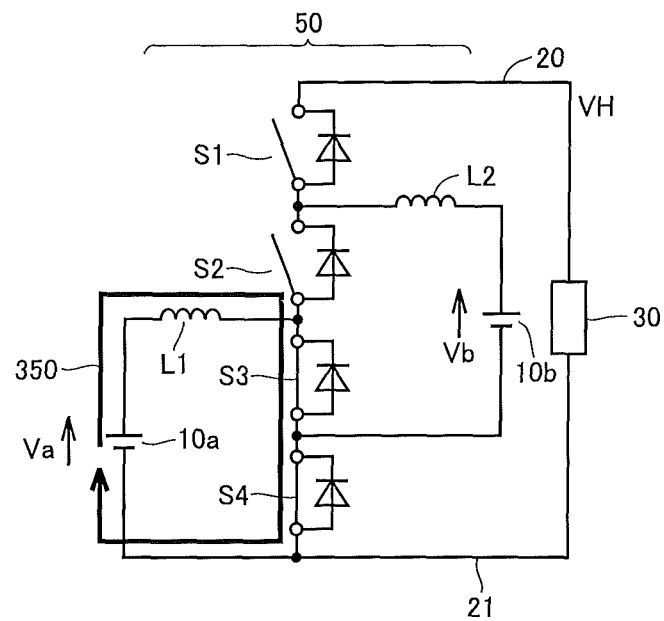
FIGS. 7(a) and 7(b) include circuit diagrams describing DC/DC conversion (boost operation) for the first DC power supply in the PB mode.
Figure 7B:
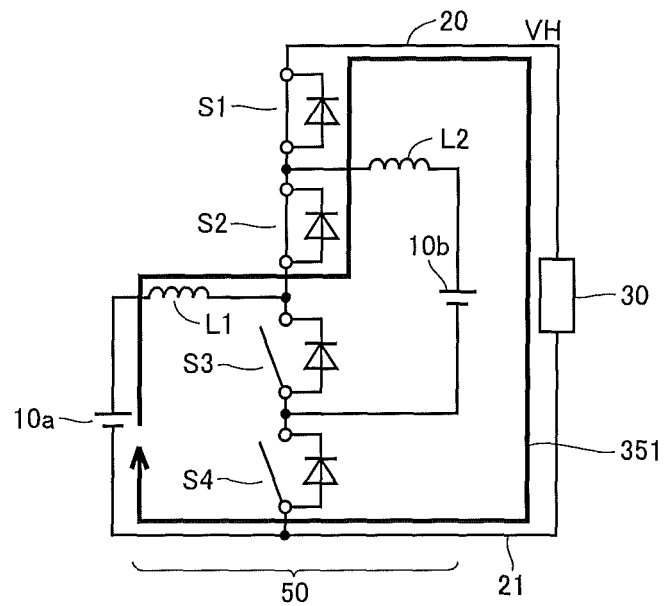

FIG. 7 shows DC/DC conversion (boost operation) for DC power supply 10a in the PB mode.

Referring to (a) of FIG. 7, by turning on the pair of switching elements S3 and S4 and turning off the pair of switching elements S1 and S2, an electric current path 350 for storing energy in reactor L1 is formed. Thus, a state in which the lower arm element of the boost chopper circuit is on is obtained.

In contrast, referring to (b) of FIG. 7, by turning off the pair of switching elements S3 and S4 and turning on the pair of switching elements S1 and S2, an electric current path 351 for outputting the energy stored in reactor L1 together with the energy of DC power supply 10a is formed. Thus, a state in which the upper arm element of the boost chopper circuit is on is obtained.

By alternately repeating the first period in which the pair of switching elements S3 and S4 is on and at least one of switching elements S1 and S2 is off and the second period in which the pair of switching elements S1 and S2 is on and at least one of switching elements S3 and S4 is off, electric current path 350 at (a) of FIG. 7 and electric current path 351 at (b) of FIG. 7 are formed alternately.

As a result, a boost chopper circuit having the pair of switching elements S1 and S2 equivalently serving as the upper arm element and the pair of switching elements S3 and S4 equivalently serving as the lower arm element is formed for DC power supply 10a. In the DC/DC converting operation shown in FIG. 7, there is no electric current circulation path to DC power supply 10b and, therefore, DC power supplies 10a and 10b do not interfere with each other. Specifically, input/output of electric power to/from DC power supplies 10a and 10b can be controlled independently.

In such DC/DC conversion, the relation expressed by Expression (1) below holds between voltage Va of DC power supply 10a and output voltage VH of electric power line 20. In Expression (1), Da represents the duty ratio of the period in which the pair of switching elements S3 and S4 is on.

$$VH=1/(1-Da)\cdot Va \tag{1}$$

Figure 8A:
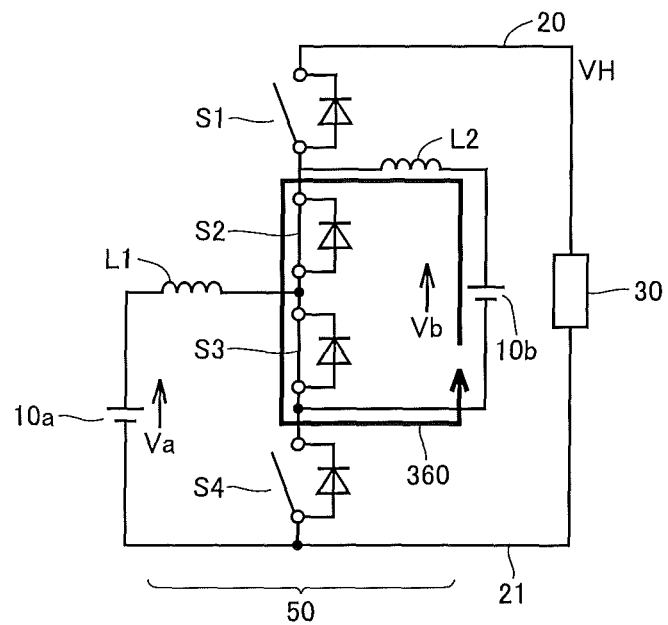
FIGS. 8(a) and 8(b) include circuit diagrams describing DC/DC conversion (boost operation) for the second DC power supply in the PB mode.
Figure 8B:
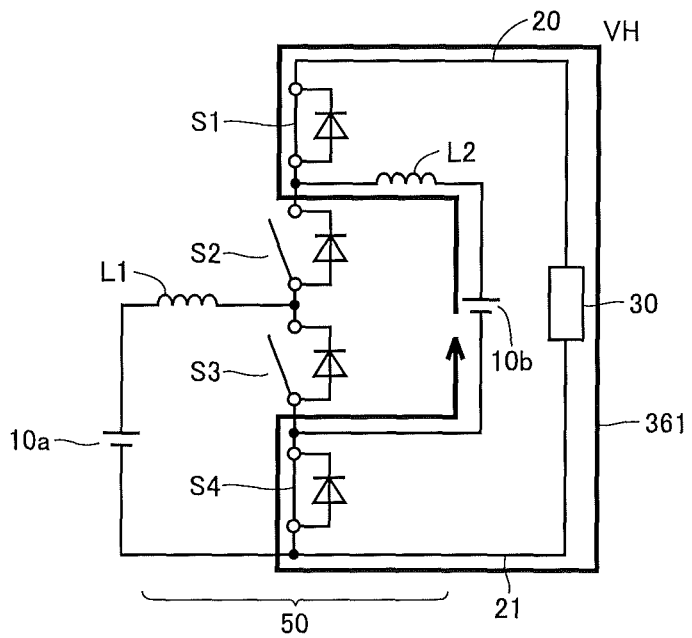

FIG. 8 shows DC/DC conversion (boost operation) for DC power supply 10b in the PB mode.

Referring to (a) of FIG. 8, by turning on the pair of switching elements S2 and S3 and turning off the pair of switching elements S1 and S4, an electric current path 360 for storing energy in reactor L2 is formed. Thus, a state in which the lower arm element of the boost chopper circuit is on is obtained.

In contrast, referring to (b) of FIG. 8, by turning off the pair of switching elements S2 and S3 and turning on the pair of switching elements S1 and S4, an electric current path 361 for outputting the energy of reactor L2 together with the energy of DC power supply 10b is formed. Thus, a state in which the upper arm element of the boost chopper circuit is on is obtained.

By alternately repeating the first period in which the pair of switching elements S2 and S3 is on and at least one of switching elements S1 and S4 is off and the second period in which the pair of switching elements S1 and S4 is on and at least one of switching elements S2 and S3 is off, electric current path 360 at (a) of FIG. 8 and electric current path 361 at (b) of FIG. 8 are formed alternately.

As a result, a boost chopper circuit having the pair of switching elements S1 and S4 equivalently serving as the upper arm element and the pair of switching elements S2 and S3 equivalently serving as the lower arm element is formed for DC power supply 10b. In the DC/DC converting operation shown in FIG. 8, there is no electric current circulation path including DC power supply 10a and, therefore, DC power supplies 10a and 10b do not interfere with each other. Specifically, input/output of electric power to/from DC power supplies 10a and 10b can be controlled independently.

In such DC/DC conversion, the relation expressed by Expression (2) below holds between voltage Vb of DC power supply 10b and output voltage VH of electric power line 20. In Expression (2), Db represents the duty ratio of the period in which the pair of switching elements S2 and S3 is on.

$$VH=1/(1-Db) \cdot Vb \qquad (2)$$

As understood from FIGS. 7 and 8, in the PB mode, the electric current produced by DC/DC conversion between DC power supply 10a and electric power line 20 and the electric current produced by DC/DC conversion between DC power supply 10b and electric power line 20 both flow into switching elements S1 to S4.

Therefore, when both the electric currents flowing as a result of power conversion are in opposite directions in each switching element, for example, when electric current path 350 shown in FIG. 7 at (a) and electric current path 361 shown in FIG. 8 at (b) are formed simultaneously, the electric currents on the both electric current paths cancel each other, and thus, the electric current passing through switching element S4 decreases. With such a phenomenon, in the PB mode, it may be possible to make the losses in switching elements S1 to S4 smaller than in the aB mode or bB mode in which DC/DC conversion is executed using a single DC power supply.

Figures 9, 10:
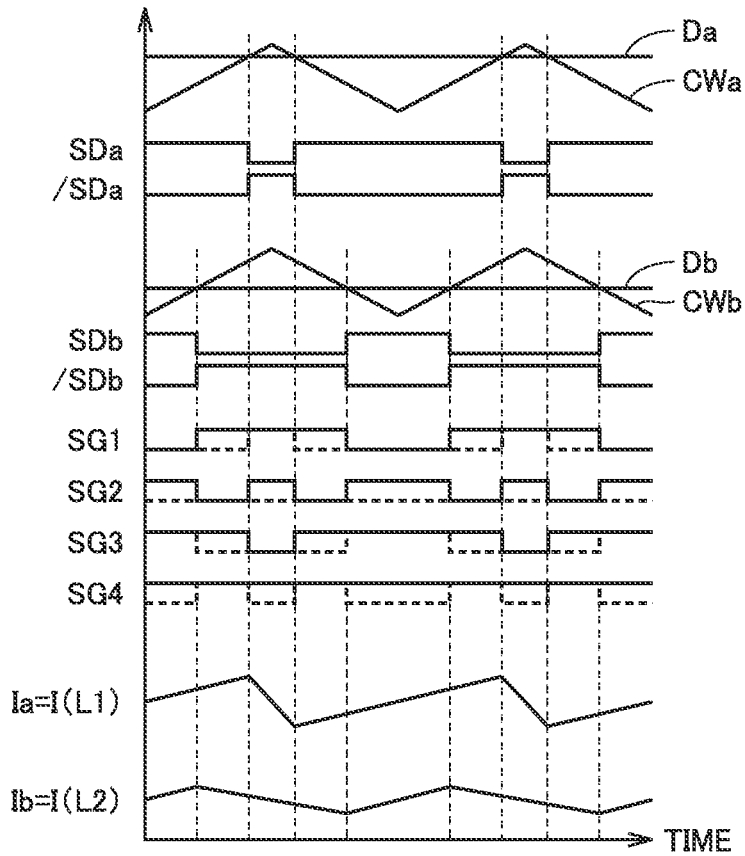
FIG. 9 is a diagram of waveforms showing an exemplary operation for controlling switching elements of the power converter in the PB mode.
FIG. 10 is a table for describing logical operational expressions for setting a control signal for each switching element in the PB mode.

FIG. 9 shows a diagram of waveforms for describing an exemplary operation for controlling switching elements in the PB mode. FIG. 9 shows an example when a carrier wave CWa used in PWM control for DC power supply 10a and a carrier wave CWb used in PWM control for DC power supply 10b have the same frequency and are in phase.

Referring to FIG. 9, in the PB mode, for example, the output of one of DC power supplies 10a and 10b can be subjected to control (voltage control) so as to compensate for a voltage deviation $\Delta VH$ of output voltage VH ($\Delta VH=VH^*-VH$) and the output of the other one of DC power supplies 10a and 10b can be subjected to control (electric current control) so as to compensate for an electric current deviation of electric current Ia, Ib, as described in PTD 2. On this occasion, a command value for electric current control ($Ia^*$ or $Ib^*$) can be set so as to control output electric power of the corresponding power supply.

As an example, when the output of DC power supply 10b is subjected to voltage control while the output of DC power supply 10a is subjected to electric current control, duty ratio Da is calculated based on an electric current deviation $\Delta Ia$ ($\Delta Ia=Ia^*-Ia$) while duty ratio Db is calculated based on voltage deviation $\Delta VH$ ($\Delta VH=VH^*-VH$).

A control pulse signal SDa is generated based on voltage comparison between duty ratio Da for controlling the output of DC power supply 10a and carrier wave CWa. Similarly, a control pulse signal SDb is generated based on comparison between duty ratio Db for controlling the output of DC power supply 10b and carrier wave CWb. Control pulse signals /SDa and /SDb are inversion signals of control pulse signals SDa and SDb, respectively.

As shown in FIG. 10, control signals SG1 to SG4 are set based on the logical calculation of control pulse signals SDa (/SDa) and SDb (/SDb).

Switching element S1 forms the upper arm element in each of the boost chopper circuits shown in FIGS. 7 and 8. Accordingly, control signal SG1 for controlling on/off of switching element S1 is generated in accordance with the logical sum of control pulse signals /SDa and /SDb. As a result, on/off of switching element S1 is controlled so as to achieve both of the function of the upper arm element of the boost chopper circuit (DC power supply 10a) shown in FIG. 7 and that of the upper arm element of the boost chopper circuit (DC power supply 10b) shown in FIG. 8.

Switching element S2 forms the upper arm element in the boost chopper circuit shown in FIG. 7, and the lower arm element in the boost chopper circuit shown in FIG. 8. Therefore, control signal SG2 for controlling on/off of switching element S2 is generated in accordance with the logical sum of control pulse signals /SDa and SDb. Accordingly, on/off of switching element S2 is controlled so as to achieve both of the function of the upper arm element of the boost chopper circuit (DC power supply 10a) shown in FIG. 7 and that of the lower arm element of the boost chopper circuit (DC power supply 10b) shown in FIG. 8.

Similarly, control signal SG3 for switching element S3 is generated in accordance with the logical sum of control pulse signals SDa and SDb. Accordingly, on/off of switching element S3 is controlled so as to achieve both of the function of the lower arm element of the boost chopper circuit (DC power supply 10a) shown in FIG. 7 and that of the lower arm element of the boost chopper circuit (DC power supply 10b) shown in FIG. 8. Control signal SG4 for switching element S4 is generated in accordance with the logical sum of control pulse signals SDa and /SDb. Accordingly, on/off of switching element S4 is controlled so as to achieve both of the function of the lower arm element of the boost chopper circuit (DC power supply 10a) shown in FIG. 7 and that of the upper arm element of the boost chopper circuit (DC power supply 10b) shown in FIG. 8.

In the PB mode, because control signals SG2 and SG4 are set at complementary levels, switching elements S2 and S4 are complementarily turned on/off. Accordingly, the operation when Vb>Va holds shown in FIG. 5 and the operation when Va>Vb holds shown in FIG. 6 are naturally switched. In addition, it is possible to perform DC power conversion in accordance with duty ratios Da and Db for DC power supplies 10a and 10b by complementarily turning switching elements S1 and S3 on/off.

Referring again to FIG. 9, control signals SG1 to SG4 are generated based on control pulse signals SDa (/SDa) and SDb (/SDb) in accordance with the logical operational expressions shown in FIG. 10. By turning switching elements S1 to S4 on/off in accordance with control signals SG1 to SG4, an electric current I(L1) flowing through reactor L1 and an electric current I(L2) flowing through reactor L2 are controlled. Electric current I(L1) corresponds to electric current Ia of DC power supply 10a, and electric current I(L2) corresponds to electric current Ib of DC power supply 10b.

In this manner, in the PB mode, upon execution of DC/DC conversion of inputting/outputting DC power in parallel between DC power supplies 10a, 10b and electric power line 20, output voltage VH can be controlled to assume voltage command value VH*. Furthermore, in accordance with the electric current command value for a DC power supply to be subjected to electric current control, electric power input/output to/from that DC power supply can be controlled.

In the PB mode, electric power covering shortage caused by input/output power to/from a DC power supply subjected to electric current control with respect to electric power input/output to/from load 30 (hereinafter also referred to as load power PL) will be input/output to/from a DC power supply subjected to voltage control. Accordingly, by setting the electric current command values in electric current control, the power distribution between the DC power supplies can be controlled indirectly. As a result, in the PB mode, the power distribution ratio between DC power supplies 10a and 10b relative to total electric power PH that DC power supplies 10a and 10b as a whole input/output to/from electric power line 20. In addition, by setting the electric current command values, an operation of allowing output power from one DC power supply to be charged into the other DC power supply (hereinafter also referred to as electric power circulation) can also be performed. Therefore, in the PB mode, voltages Va and Vb can be adjusted by individually controlling the charging level of DC power supplies 10a and 10b as well as by performing voltage control of output voltage VH involving input/output of total electric power PH.

Hereinbelow, electric power values of output power Pa, Pb, total electric power PH, and load power PL will be expressed by positive values during discharging of respective DC power supplies 10a and 10b as well as during a powering operation of load 30, and will be expressed by negative values during charging of respective DC power supplies 10a and 10b as well as during a regenerative operation of load 30.

(Circuit Operation in aB Mode and bB Mode)

The circuit operations in the boosting modes (aB mode and bB mode) in which only one of DC power supplies 10a and 10b is used are common to the circuit operations shown in FIGS. 7 and 8.

In the aB mode, by the switching operations shown at (a) and (b) of FIG. 7, bidirectional DC/DC conversion is executed between DC power supply 10a and electric power line 20 (load 30) without using DC power supply 10b. Therefore, in the aB mode, switching elements S1 to S4 are controlled in accordance with control pulse signal SDa based on duty ratio Da for controlling the output of DC power supply 10a.

Specifically, on/off of switching elements S3 and S4 constituting the lower arm element of the boost chopper circuit shown at (a) and (b) of FIG. 7 is controlled in common in accordance with control pulse signal SDa. Similarly, on/off of switching elements S1 and S2 constituting the upper arm element of the boost chopper circuit is controlled in common in accordance with control pulse signal/SDa.

Similarly, in the bB mode, by the switching operations shown at (a) and (b) of FIG. 8, bidirectional DC/DC conversion is executed between DC power supply 10b and electric power line 20 (load 30) without using DC power supply 10a. Therefore, in the bB mode, switching elements S1 to S4 are controlled in accordance with control pulse signal SDb based on duty ratio Db for controlling the output of DC power supply 10b.

Specifically, on/off of switching elements S2 and S3 constituting the lower arm element of the boost chopper circuit shown at (a) and (b) of FIG. 8 is controlled in common in accordance with control pulse signal SDb. Similarly, on/off of switching elements S51 and S4 constituting the upper arm element of the boost chopper circuit is controlled in common in accordance with control pulse signal/SDb.

In each of the aB mode and bB mode, the voltage of one of DC power supplies 10a and 10b used can be adjusted by controlling power converter 50.

(Circuit Operation in Direct Connection Mode)

It is appreciated that, in the direct connection mode, any one of the PD mode, SD mode, aD mode, and bD mode can be achieved by keeping switching elements S51 to S4 on/off in accordance with FIG. 3.

(Circuit Operation in SB Mode)

Next, circuit operations in the SB mode will be described with reference to FIGS. 11 and 12.

Figure 11A:
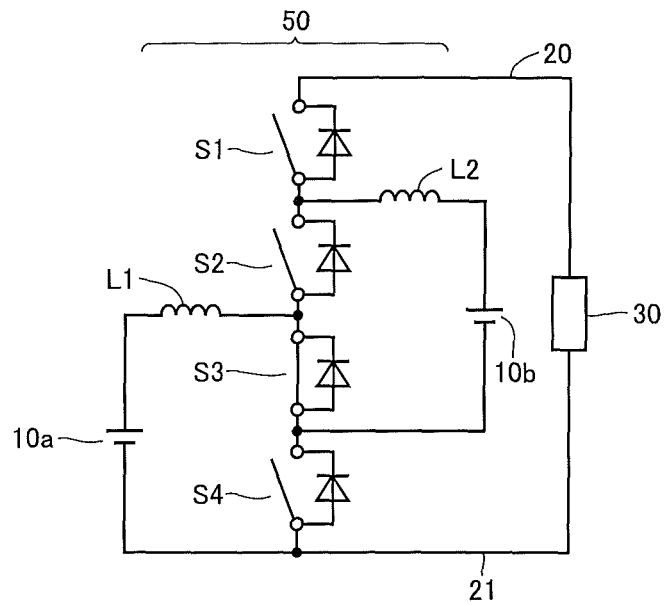
FIGS. 11(a) and 11(b) include circuit diagrams describing a circuit operation in an SB mode.
Figure 11B:
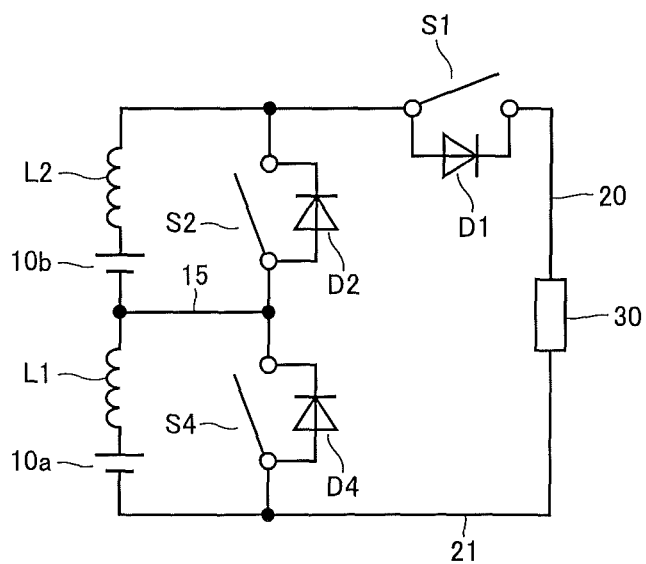

As shown at (a) of FIG. 11, by keeping switching element S3 on, DC power supplies 10a and 10b can be connected in series with electric power line 20. The equivalent circuit at this time is as shown at (b) of FIG. 11.

Referring to (b) of FIG. 11, in the SB mode, between DC power supplies 10a and 10b connected in series and electric power line 20, the on- and off-periods of the lower arm element of the boost chopper circuit can be formed alternately by commonly controlling on/off of switching elements S2 and S4. Switching element S1, which is turned on in the off-period of switching elements S2 and S4, operates as a switch for controlling regeneration from load 30. Further, switching element S3 kept on equivalently forms a line 15 connecting reactor L1 to switching element S4.

Next, referring to FIG. 12, the DC/DC conversion (boost operation) in the SB mode will be described.

Figure 12A:
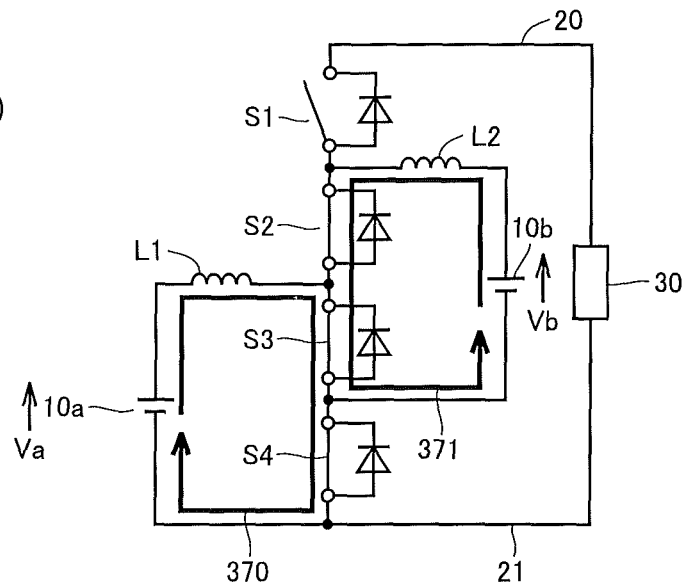
FIGS. 12(a) and 12(b) include circuit diagrams describing DC/DC conversion (boost operation) in the SB mode.
Figure 12B:
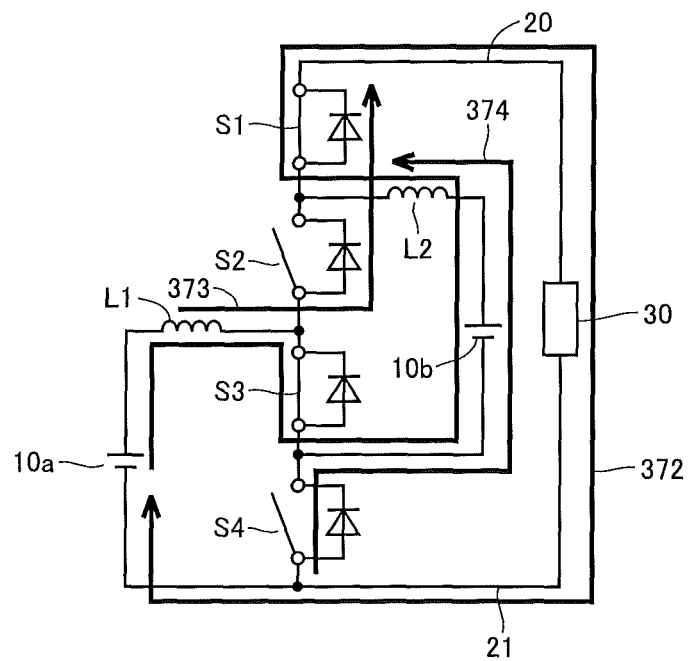

Referring to (a) of FIG. 12, while switching element S3 is kept on for connecting DC power supplies 10a and 10b in series, the pair of switching elements S2 and S4 is turned on and switching element S1 is turned off. Accordingly, electric current paths 370 and 371 for storing energy in reactors L1 and L2 are formed. As a result, for series-connected DC power supplies 10a and 10b, a state in which the lower arm element of the boost chopper circuit is on is obtained.

In contrast, referring to (b) of FIG. 12, while switching element S3 is kept on, the pair of switching elements S2 and S4 is turned off and switching element S1 is turned on, in contrast to (a) of FIG. 12. Accordingly, an electric current path 372 is formed. Through electric current path 372, the sum of energy from DC power supplies 10a and 10b connected in series and energy stored in reactors L1 and L2 is output to electric power line 20. As a result, for series-connected DC power supplies 10a and 10b, a state in which the upper arm element of the boost chopper circuit is on is obtained.

With switching element S3 kept on, by alternately repeating the first period in which the pair of switching elements S2 and S4 is on and switching element S1 is off and the second period in which switching element S1 is on and switching elements S2 and S4 are off, electric current paths 370 and 371 at (a) of FIG. 12 and electric current path 372 at (b) of FIG. 12 are formed alternately.

In the DC/DC conversion in the SB mode, the relation expressed by Expression (3) below holds among voltage Va of DC power supply 10a, voltage Vb of DC power supply 10b and output voltage VH of electric power line 20. In Expression (3), Dc represents the duty ratio of the first period in which the pair of switching elements S2 and S4 is on.

$$VH=1/(1-Dc)\cdot(Va+Vb) \quad (3)$$

It is noted, however, that if Va and Vb are different or if reactors L1 and L2 have different inductances, reactors L1 and L2 come to have different electric current values at the end of the operation shown at (a) of FIG. 12. Therefore, immediately after the transition to the operation shown at (b) of FIG. 12, if the electric current of reactor L1 is larger, a difference current flows through an electric current path 373. If the electric current of reactor L2 is larger, a difference current flows through an electric current path 374.

Figures 13, 14:
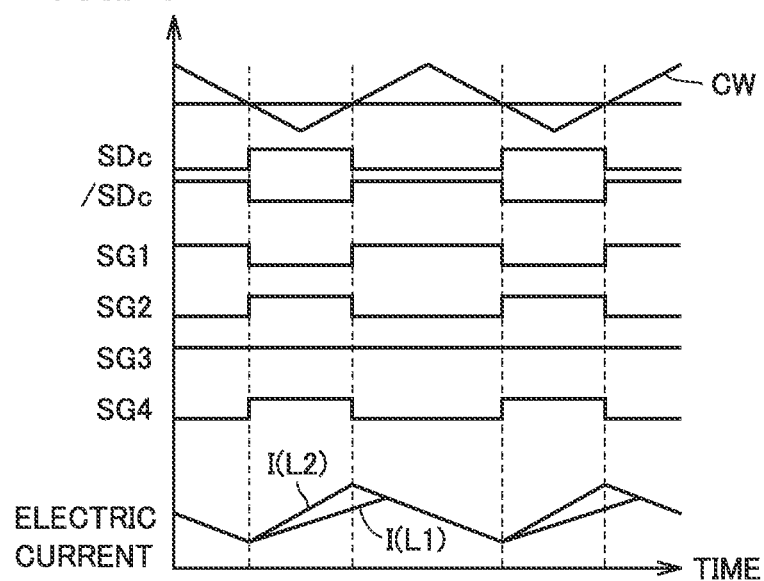
FIG. 13 is a diagram of waveforms showing an exemplary operation for controlling switching elements of the power converter in the SB mode.
FIG. 14 is a table for describing logical operational expressions for setting a control signal for each switching element in the SB mode.

FIG. 13 shows a waveform diagram for describing an exemplary operation for controlling the switching elements in the SB mode.

In the SB mode, as described in PTD 2, duty ratio Dc in Expression (3) is calculated so as to compensate for voltage deviation ΔVH of output voltage VH (ΔVH=VH*−VH). Then, a control pulse signal SDc is generated based on voltage comparison between a carrier wave CW and duty ratio Dc. A control pulse signal /SDc is an inversion signal of control pulse signal SDc. In the SB mode, DC/DC conversion between the DC voltage (Va+Vb) and output voltage VH is executed by the boost chopper circuit shown in FIG. 10.

As shown in FIG. 14, control signals SG1 to SG4 can be set based on a logical operation of control pulse signal SDc (/SDc).

Control pulse signal SDc is set as control signals SG2 and SG4 for the pair of switching elements S2 and S4 constituting the lower arm element of the boost chopper circuit. Similarly, control signal SG1 for switching element S1 constituting the upper arm element of the boost chopper circuit is obtained by control pulse signal /SDc. As a result, the period in which the pair of switching elements S2 and S4 constituting the lower arm element is on and the period in which switching element S1 constituting the upper arm element is on are provided complementarily.

In the SB mode, bidirectional DC/DC conversion is executed between DC power supplies 10a and 10b in the series-connected state and electric power line 20 (load 30). Therefore, output power Pa of DC power supply 10a and output power Pb of DC power supply 10b cannot be directly controlled. That is, the ratio between output power Pa and output power Pb of DC power supplies 10a and 10b is automatically determined depending on the ratio between voltages Va and Vb in accordance with Expression (4) below.

$$Pa:Pb=Va:Vb \quad (4)$$

It is noted that electric power is input/output supplied to load 30 in accordance with the sum of output power (Pa+Pb) from DC power supplies 10a and 10b, similarly to the PB mode.

(Selection of Operation Mode and Voltage Adjustment Control)

Processing of selecting an operation mode in the power converter control according to the present embodiment will be described below in detail.

Figures 15, 16:
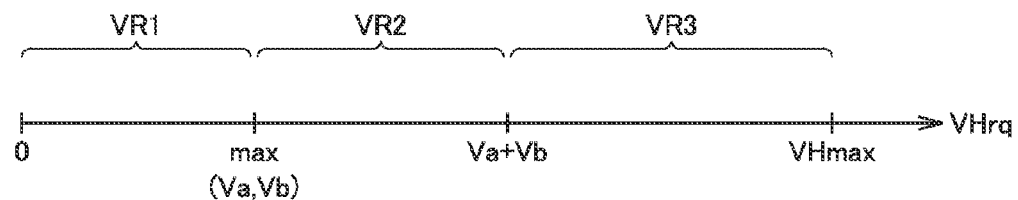
FIG. 15 is a table for comparing whether or not to control a power distribution ratio between the DC power supplies in each operation mode shown in FIG. 3 and a settable range of output voltage.
FIG. 16 is a conceptual view for describing the definition of a voltage range of a load request voltage.

FIG. 15 shows whether or not to control power distribution between DC power supplies 10a and 10b and a settable range of output voltage VH in each operation mode shown in FIG. 3.

Referring to FIG. 15, in the PB mode, by setting the electric current command value in a DC power supply to be subjected to electric current control, power distribution ratio k between DC power supplies 10a and 10b can be controlled. It is noted that power distribution ratio k is defined by the ratio of output power Pa of DC power supply 10a with respect to total electric power PH (k=Pa/PH). That is, in the PB mode, power distribution ratio k can be set at any value within the range of 0 to 1.0. In the PB mode, output voltage VH can be controlled within the range from max(Va, Vb) representing the maximum value of voltages Va and Vb to an upper limit voltage VHmax representing the control upper limit value of output voltage VH (max(Va, Vb)≤VH≤VHmax). It is noted that max(Va, Vb)=Va holds when Va>Vb holds, and max(Va, Vb)=Vb holds when Vb>Va holds. Upper limit voltage VHmax is an upper limit value determined in consideration of the withstand voltages of parts and the like.

In the SB mode, as understood from Equation (4), power distribution ratio k is determined automatically in accordance with voltages Va and Vb. Therefore, output power Pa and output power Pb of DC power supplies 10a and 10b cannot be controlled independently. Output voltage VH cannot be set at a value lower than (Va+Vb). In the SB mode, output voltage VH can be controlled within the range from (Va+Vb) to upper limit voltage VHmax (Va+Vb<VH≤VHmax).

Since only DC power supply 10a is used in the aB mode, power distribution ratio k is kept at 1.0. Then, by controlling the boost chopper circuit shown in FIG. 8 based on duty ratio Da in Equation (1), output voltage VH can be controlled within the range from max(Va, Vb) to upper limit voltage VHmax.

Since only DC power supply 10b is used in the bB mode, power distribution ratio k is kept at 0. Then, by controlling the boost chopper circuit shown in FIG. 8 based on duty ratio Db in Equation (2), output voltage VH can be controlled within the range from max(Va, Vb) to VHmax (max(Va, Vb)<VH≤VHmax).

In the PD mode, DC power supplies 10a and 10b are connected in parallel with electric power line 20. Therefore, power distribution ratio k is determined uniquely depending on internal resistances of DC power supplies 10a and 10b. Thus, output power Pa and output power Pb of respective DC power supplies 10a and 10b cannot be controlled independently. Specifically, k=Rb/(Ra+Rb) holds where Ra indicates the internal resistance of DC power supply 10a and Rb indicates the internal resistance of DC power supply 10b. Since VH=Va (VH=Vb) is kept, output voltage VH cannot be controlled in accordance with voltage command value VH*. It is noted that the PD mode can be applied limitedly when the voltage difference between voltages Va and Vb is small, as described above.

In the SD mode, DC power supplies 10a and 10b are electrically connected in series with electric power line 20. Therefore, output voltage VH is kept at Va+Vb. That is, output voltage VH cannot be controlled in accordance with voltage command value VH*. Power distribution ratio k is determined in a fixed manner in accordance with voltages Va and Vb similarly to the SB mode, and thus cannot be controlled freely.

When the aD mode is applied, satisfaction of Va>Vb is a requirement as described above. Therefore, DC power supply 10b is disconnected from electric power line 20, while DC power supply 10a is connected to electric power line 20. Thus, output voltage VH is kept at Va. Since supply of electric power is executed only from DC power supply 10a, power distribution ratio k is kept at 1.0.

Similarly, when the bD mode is applied, satisfaction of Vb>Va is a requirement as described above. Therefore, DC power supply 10a is disconnected from electric power line 20, while DC power supply 10b is connected to electric power line 20. Thus, output voltage VH is kept at Vb. Since supply of electric power is executed only from DC power supply 10b, power distribution ratio k is kept at 0.

As understood from FIG. 15, the range of output voltage VH that can be output from power converter 50 differs among the respective operation modes. Moreover, since the power distribution between DC power supplies 10a and 10b can be controlled in the PB mode as described above, voltages Va and Vb can be adjusted simultaneously with control of output voltage VH. On the other hand, the power distribution between DC power supplies 10a and 10b cannot be controlled freely in the remaining SB mode, SD mode, aB mode, bB mode, aD mode, bD mode, and PD mode.

Here, output voltage VH to be supplied to load 30 needs to be set at more than or equal to a certain voltage depending on the operation condition of load 30. When load 30 is configured to include motor-generator 35 as illustrated in FIG. 2, it is necessary that output voltage VH equivalent to a DC link-side voltage of inverter 32 be more than or equal to an induced voltage produced in a coil winding (not shown) of motor-generator 35.

The range of torque that can be output from motor-generator 35 changes in accordance with output voltage VH. Specifically, as output voltage VH is increased, the torque that can be output is also increased. It is therefore necessary that, for example, output voltage VH fall within a voltage range where motor-generator 35 can output torque equivalent to a torque command value determined by traveling control of the electric-powered vehicle.

From these viewpoints, a load minimum voltage VHmin equivalent to the minimum value of output voltage VH for operating load 30 can be set depending on the operating condition of load 30 (in the exemplary configuration FIG. 2, torque and rotation speed of motor-generator 35). Therefore, load request voltage VHrq can be determined in correspondence with load minimum voltage VHmin.

Furthermore, in torque control of motor-generator 35, the phases of currents when same torque is output vary with the DC link voltage (output voltage VH) of inverter 32. The ratio of output torque to amplitude of electric current in motor-generator 35, namely, motor efficiency, varies in accordance with the phases of currents. Therefore, when a torque command value for motor-generator 35 is set, optimum phases of currents in which efficiency in motor-generator 35 is maximized, that is, power loss in motor-generator 35 is minimized, as well as output voltage VH for achieving this optimum phases of currents can be determined in correspondence with that torque command value. In the present embodiment, load request voltage VHrq is preferably determined further considering efficiency in load 30.

Taking these elements into consideration, a load request voltage VHrq with respect to output voltage VH can be set previously in correspondence with the operating condition of load 30 (e.g., the torque and rotation speed). Then, output voltage VH needs to be controlled by power converter 50 to fall at least within the range where VH≥VHrq holds. Furthermore, if VH is set at VHrq, the loss in load 30 shall be able to be suppressed.

In this way, it is understood that the relation VH≥VHrq can be achieved depending on the range of load request voltage VHrq set in accordance with the operating condition of load 30, that is, an applicable operation mode varies.

Figure 17:
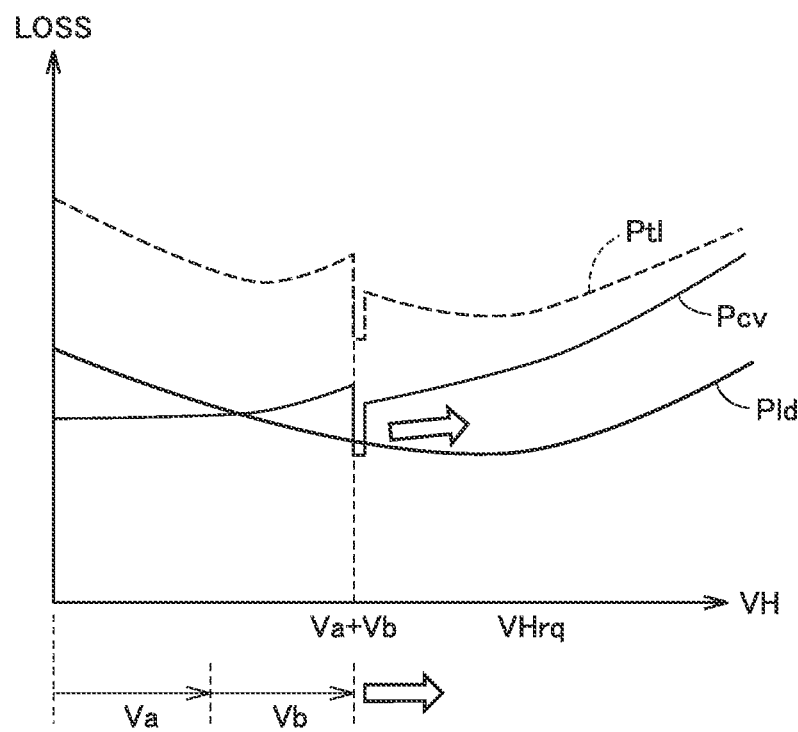
FIG. 17 is a first conceptual view for describing the characteristics of the loss of the power supply system with respect to changes in output voltage.

FIG. 16 shows the definition of voltage ranges VR1 to VR3 of load request voltage VHrq. FIG. 17 shows a diagram for describing selection of an operation mode in each voltage range.

Referring to FIG. 16, load request voltage VHrq is set to fall within any one of voltage ranges VR1 (VHrq≤max(Va, Vb), VR2 (max(Va, Vb)<VHrq≤Va+Vb) and VR3 (Va+Vb<VHrq≤VHmax).

Since power converter 50 cannot output a voltage lower than max(Va, Vb), it is not possible to match output voltage VH with load request voltage VHrq when load request voltage VHrq falls within voltage range VR1. Therefore, in voltage range VR1, any one of the aD mode, the bD mode and the PD mode is preferably selected in order to bring VH as close as possible to VHrq within the range where VH≥VHrq holds.

It is noted that the applicable operation mode also varies in accordance the relationship between voltages Va and Vb, as described above. That is, when Va>Vb holds, only the aD mode is applicable while the bD mode and the PD mode are not applicable. Similarly, when Vb>Va holds, only the bD mode is applicable while the aD mode and the PD mode are not applicable. On the other hand, when the voltage difference between Va and Vb is so small that it can be regarded that Va=Vb holds, it is possible to apply the aD mode, the bD mode and the PD mode.

In the aB mode, the bB mode and the PB mode belonging to the boosting mode, output voltage VH can be controlled in accordance with voltage command value VH* within the range of max(Va, Vb) to VHmax. On the other hand, in the SB mode, output voltage VH cannot be controlled to be lower than (Va+Vb). That is, output voltage VH can be controlled in accordance with voltage command value VH* within the range of (Va+Vb) to VHmax.

In voltage range VR2, the aB mode, the bB mode and the PB mode can be selected in light of the controllable range of output voltage VH in each operation mode described above. When these operation modes are applied, it is possible to match output voltage VH with load request voltage VHrq by setting such that VH*=VHrq holds. On the other hand, the aD mode, the bD mode and the PD mode are not applicable.

Furthermore, the SD mode is applicable in voltage range VR2 since the requirement that VH≥VHrq holds is satisfied. In the SD mode, the loss of power converter 50 is suppressed significantly, although it is not possible to match output voltage VH (VH=Va+Vb) with load request voltage VHrq. Therefore, the total loss of power supply system 5 can be suppressed as compared to the case when the aB mode, the bB mode and the PB mode are applied. Therefore, the SD mode can also be included in the group of operation modes applicable in voltage range VR2.

In voltage range VR3, the PB mode, the SB mode, the aB mode, the bB mode, and the PB mode are selected as the group of applicable operation modes in light of the controllable range of output voltage VH in each operation mode described above. When these operation modes are applied, it is possible to match output voltage VH with load request voltage VHrq by setting such that VH*=VHrq holds. On the other hand, each direct connection mode (aD mode, bD mode, PD mode, and SD mode) is not applicable.

In this way, selectable operation modes vary in accordance with the relationship between output voltage VH (VH≥VHrq) associated with load request voltage VHrq and voltages Va, Vb. Among them, an operation mode is preferably selected such that the total loss of power supply system 5 is suppressed.

FIG. 17 shows a first conceptual view for describing the characteristics of the loss of the power supply system with respect to changes in output voltage VH.

The horizontal axis of FIG. 17 indicates output voltage VH of power converter 50, and the vertical axis indicates the loss of the power supply system. FIG. 17 shows the characteristics of the loss of the power supply system with respect to changes in output voltage VH where the operating point of load 30 (rotation speed and torque of motor-generator 35), that is, load power PL is the same.

Referring to FIG. 17, the power loss of power converter 50 (hereinafter also referred to as a converter loss Pcv) is suppressed by the application of the aD mode, the bD mode or the PD mode in the voltage range where VH≤Va or VH≤Vb holds. In the voltage range where VH>Va, Vb holds, the boosting ratio increases in accordance with the increase in output voltage VH, so that converter loss Pcv increases.

When VH=Va+Vb holds, converter loss Pcv decreases specifically by the application of the SD mode. Although the SB mode is applicable in the voltage range where VH>(Va+Vb) holds, converter loss Pcv increases in accordance with the increase in output voltage VH. In the SB mode, since the boosting ratio in power converter 50 decreases as described above, converter loss Pcv can be suppressed as compared with the time when the PB mode, the aB mode and the bB mode are applied. However, converter loss Pcv in the SB mode is larger than converter loss Pcv when the SD mode is used.

As described above, by setting load request voltage VHrq in consideration of the loss of load 30, the power loss of load 30 (hereinafter also briefly referred to as a load loss Pld) is minimized when VH=VHrq holds. Load loss Pld corresponds to the sum of power losses of inverter 32 and motor-generator 35 in the exemplary configuration of FIG. 2. Therefore, by setting voltage command value VH* at VHrq, output voltage VH can be controlled to ensure the operation of load 30 while suppressing load loss Pld.

However, since converter loss Pcv cab be decreased significantly when VH=Va+Vb holds, total loss Ptl of power supply system 5 may not be minimized, even by controlling VH to be VHrq. Here, total loss Ptl corresponds to the sum of converter loss Pcv and load loss Pld.

Therefore, in the present embodiment, the output voltage control for controlling output voltage VH in accordance with voltage command value VH* and the voltage adjustment control for matching voltage Va+Vb with voltage command value VH* are combined to control DC/DC power conversion in power converter 50. In the case where VH*(VHrq) >Va+Vb holds as in the example of FIG. 17, the voltage adjustment control is executed such that Va+Vb is increased toward VH*.

Figure 18:
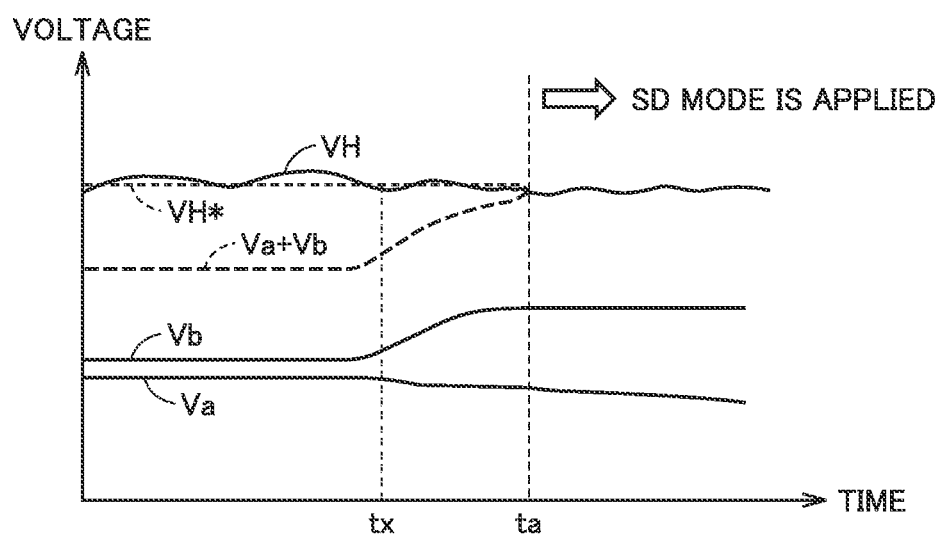
FIG. 18 is a conceptual diagram of operation waveforms showing an example of voltage adjustment control for increasing the sum of output voltages of the DC power supplies.

FIG. 18 shows exemplary operation waveforms of voltage adjustment control for increasing Va+Vb.

Referring to FIG. 18, prior to time tx, Va+Vb is lower than output voltage VH controlled in accordance with VH*. Therefore, in order to apply the SD mode which is advantageous in terms of efficiency, the voltage adjustment control is started at time tx.

As described above, comparing DC power supplies 10a and 10b, DC power supply 10b exhibits a greater voltage change with respect to input/output of the same amount of electric power. Therefore, the voltage adjustment control is executed so as to match Va+Vb with VH (VH*) by increasing or decreasing voltage Vb. In the example of FIG. 17, in order to increase Va+Vb toward VH*, the voltage adjustment control is executed such that voltage Vb is increased by charging of DC power supply 10b.

In the example of FIG. 18, the voltage adjustment control is executed mainly by means of power circulation between DC power supplies 10a and 10b, that is, by charging DC power supply 10b with output power of DC power supply 10a. Since the amount of increase in voltage Vb caused by charging of DC power supply 10b is larger than the amount of decrease in voltage Va caused by discharging of DC power supply 10a, voltage Va+Vb is increased relative to that before execution of the voltage adjustment control.

Then, when the voltage difference between (Va+Vb) and VH (VH*=VHrq) falls below a predetermined reference value at time ta, it is determined that Va+Vb and VH have become equivalent, and the voltage adjustment control is terminated. After time ta, the SD mode is applied. It is noted that since the PB mode in which power distribution between DC power supplies 10a and 10b can be controlled needs to be applied in order to perform power circulation, the operation mode is switched from the PB mode to the SD mode at time ta in FIG. 18.

When the SD mode is applied with output voltage VH controlled in accordance with VH*=VHrq having become equivalent to Va+Vb, both converter loss Pcv and load loss Pld are reduced. Thus, the overall efficiency of power supply system 5 can be increased significantly.

It is noted that although FIG. 18 shows an exemplary operation of the voltage adjustment control mainly concerned with power circulation control, it is also possible to execute the voltage adjustment control for increasing Va+Vb by intensively charging DC power supply 10b during the regeneration operation of load 30 (i.e., PH<0, PL<0) without involving power circulation. In this case, the power adjustment control can be executed by setting power distribution ratio k (e.g., k=0) such that DC power supply 10b is charged intensively with the PB mode having been selected. Alternatively, in the PB mode, it is also possible to execute the voltage adjustment control such that DC power supply 10b is charged with both the output power from DC power supply 10a and the regenerative power from the load with both of DC power supply 10b.

Alternatively, it is also possible to execute the voltage adjustment control by selecting the bB mode such that only DC power supply 10b is subjected to charging with the regenerative power from load 30.

Figure 19:
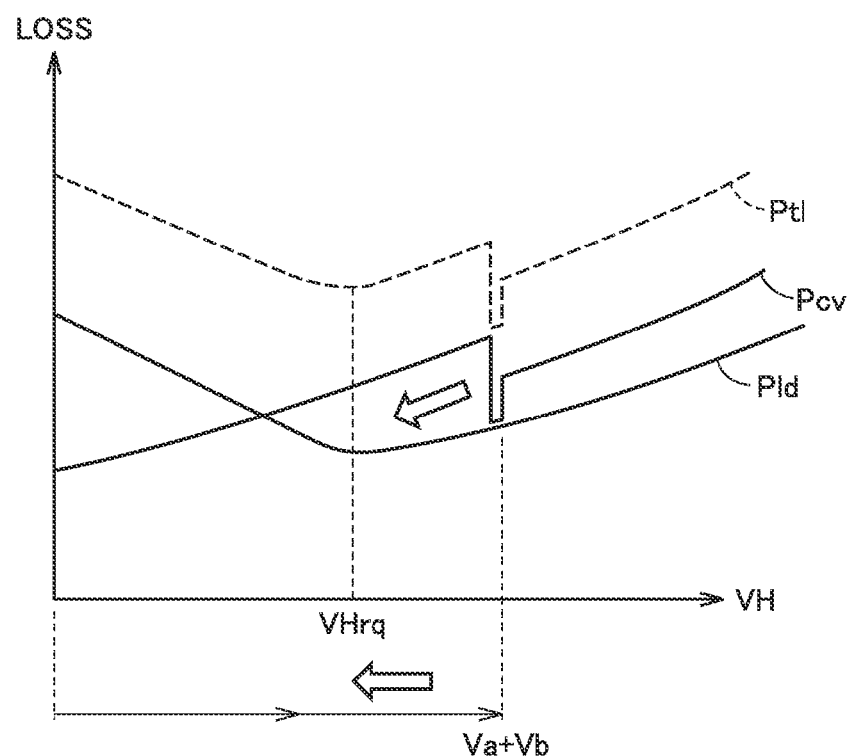
FIG. 19 is a second conceptual view for describing the characteristics of the loss of the power supply system with respect to changes in output voltage.

FIG. 19 shows a second conceptual view for describing the characteristics of the loss of the power supply system with respect to changes in output voltage VH. FIG. 19 also shows the characteristics of the loss of the power supply system with respect to changes in output voltage VH where the operating point of load 30 (rotation speed and torque of motor-generator 35), that is, load power PL is the same, similarly to FIG. 17.

Referring to FIG. 19, load loss Pld is minimized when VH=VHrq holds. However, VH=Va+Vb at which converter loss Pcv is minimized is higher than VHrq by the application of the SD mode.

Therefore, in the case where VH*(VHrq)<Va+Vb holds as in the example of FIG. 19, the voltage adjustment control is executed such that Va+Vb is decreased toward VH*.

Figure 20:
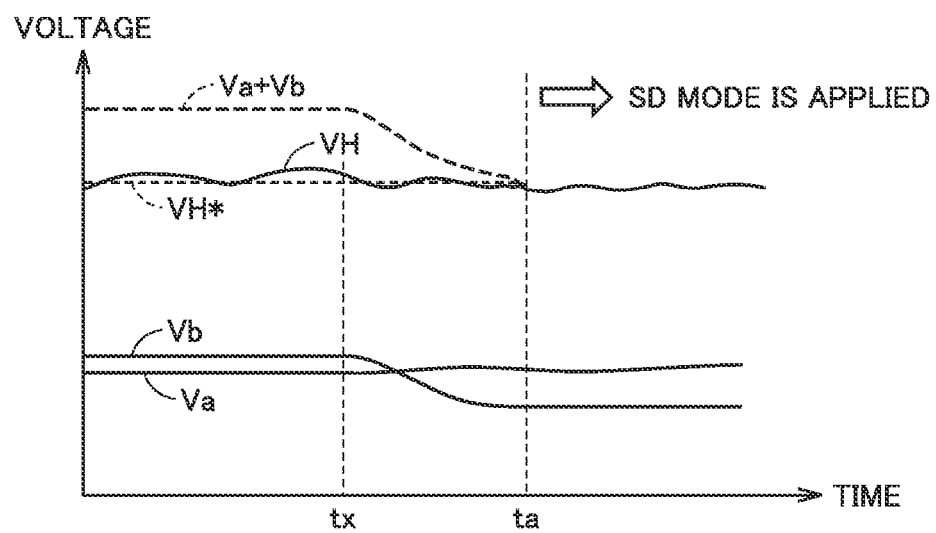
FIG. 20 is a conceptual diagram of operation waveforms showing an example of voltage adjustment control for decreasing the sum of output voltages of the DC power supplies.

FIG. 20 shows exemplary operation waveforms of voltage adjustment control for decreasing Va+Vb.

Referring to FIG. 20, prior to time tx, Va+Vb is higher than output voltage VH controlled in accordance with VH*. Therefore, in order to apply the SD mode which is advantageous in terms of efficiency, the voltage adjustment control is started at time tx. In the example of FIG. 20, in order to decrease Va+Vb toward VH*, the voltage adjustment control is executed such that voltage Vb is decreased by discharging DC power supply 10b.

In the example of FIG. 20, the voltage adjustment control is executed mainly by power circulation between DC power supplies 10a and 10b, specifically, by charging DC power supply 10a with the output power of DC power supply 10b, similarly to FIG. 18. Since the amount of decrease in voltage Vb caused by discharging of DC power supply 10b whose voltage changes largely is larger than the amount of increase in voltage Va caused by charging of DC power supply 10a whose voltage less changes, voltage Va+Vb is decreased relative to that before the execution of the voltage adjustment control.

When the voltage difference between (Va+Vb) and VH (VH*=VHrq) falls below a predetermined reference value at time tb similarly to FIG. 18, the voltage adjustment control is terminated. After time ta, the SD mode is applied. Also in FIG. 20, the operation mode is switched from the PB mode to the SD mode at time ta. Accordingly, the SD mode can be applied with output voltage VH controlled in accordance with VH*=VHrq having become equivalent to Va+Vb. Accordingly, the overall efficiency of power supply system 5 can be improved by reducing both converter loss Pcv and load loss Pld.

It is noted that although FIG. 20 shows an exemplary operation of the voltage adjustment control mainly concerned with power circulation control, it is also possible to execute the voltage adjustment control for decreasing Va+Vb by intensively discharging DC power supply 10b during the powering operation of load 30 (i.e., PH>0, PL>0) without involving power circulation. In this case, the power adjustment control can be executed by setting power distribution ratio k (e.g., k=0) such that DC power supply 10b is discharged intensively with the PB mode having been selected. Alternatively, in the PB mode, it is also possible to execute the voltage adjustment control such that load power PL is supplied by means of power circulation for charging DC power supply 10a by making the output power from DC power supply 10b larger than load power PL (Pb>PL). It is also possible to execute the voltage adjustment control by selecting the bB mode to supply load power PL only using DC power supply 10b.

Figure 21:
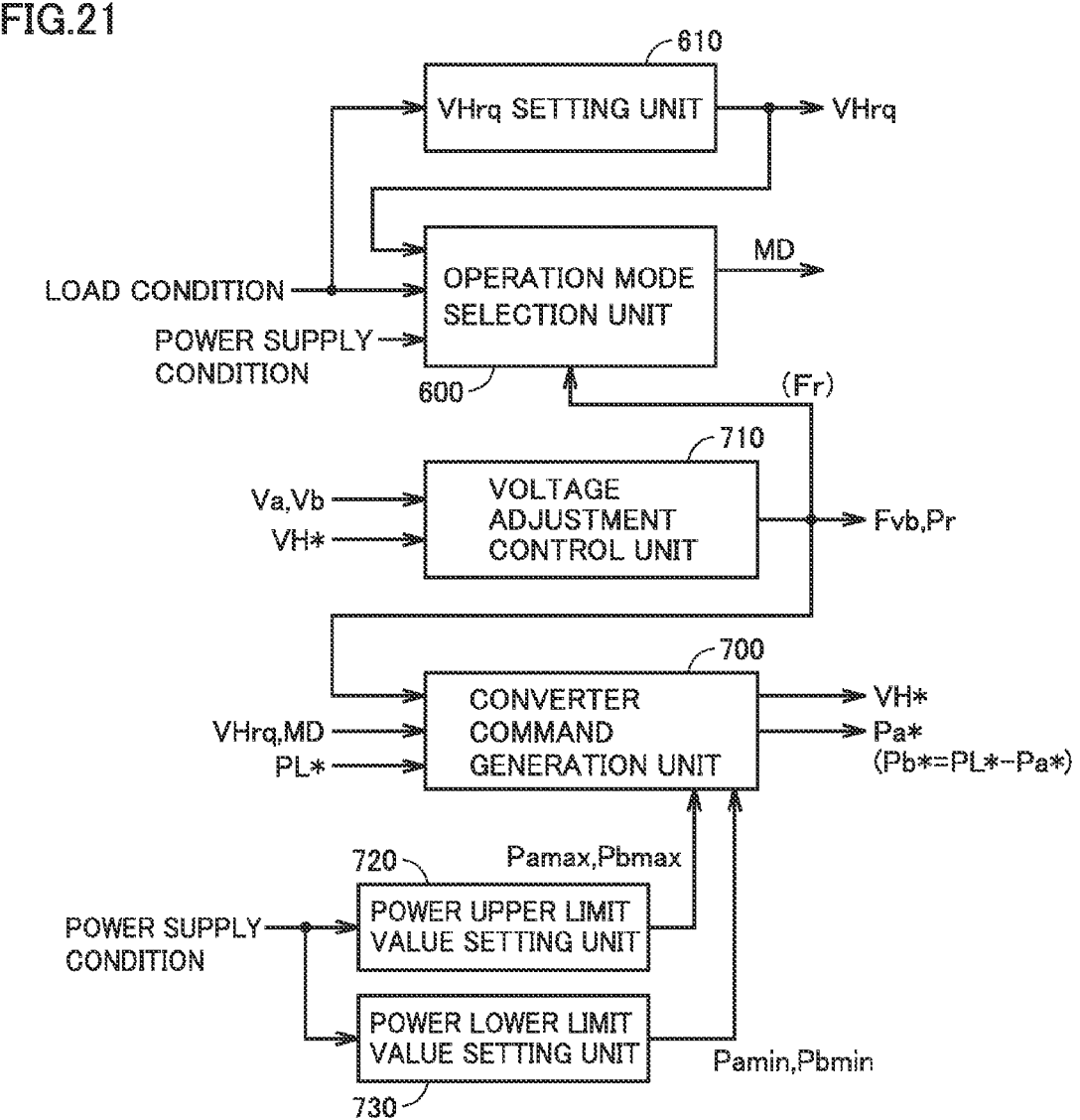
FIG. 21 is a functional block diagram for describing a control configuration related to voltage adjustment control by power converter control according to the first embodiment.

FIG. 21 is a functional block diagram for describing a control configuration related to voltage adjustment control by power converter control according to the present first embodiment. It is noted that each functional block depicted in the respective functional block diagrams including FIG. 21 shall be achieved by hardware and/or software processing performed by control device 40.

Referring to FIG. 21, a VHrq setting unit 610 sets load request voltage VHrq in accordance with the operating condition of load 30. When load 30 includes motor-generator 35 as in the exemplary configuration of FIG. 2, load request voltage VHrq can be determined based on the rotation speed and torque of motor-generator 35. Alternatively, it is also possible to set load request voltage VHrq using, as the operating condition of load 30, the operating condition (vehicular speed, accelerator pedal position, etc.) of an electric-powered vehicle on which motor-generator 35 is mounted.

An operation mode selection unit 600 selects an operation mode based on load request voltage VHrq and load power command value PL* obtained in accordance with the operating condition of load 30, and based on the operating condition (power supply condition) of DC power supplies 10a and 10b. Operation mode selection unit 600 generates mode selection signal MD indicating the selection result of an operation mode. It is noted that load power command value PL* is equivalent to load power PL when load 30 operates in accordance with an operation command. For example, load power command value PL* can be obtained from the rotation speed and torque command value for motor-generator 35.

A converter command generation unit 700 generates voltage command value VH* based on mode selection signal MD and load request voltage VHrq. Converter command generation unit 700 further sets power command value Pa* for DC power supply 10a subjected to current control based on load power command value PL*, mode selection signal MD, circulation power value Pr, a voltage adjustment flag Fvb, electric power upper limit values Pamax, Pbmax, and electric power lower limit values Pamin, Pbmin.

A voltage adjustment control unit 710 generates voltage adjustment flag Fvb indicating whether or not to execute the voltage adjustment control based on voltages Va, Vb of DC power supplies 10a, 10b, and voltage command value VH*. Voltage adjustment flag Fvb is turned on when the voltage adjustment control is executed, and is turned off when the voltage adjustment control is not executed. Furthermore, voltage adjustment control unit 710 sets circulation power value Pr for power circulation in accordance with execution and non-execution of the voltage adjustment control.

Circulation power value Pr is set for adjusting the voltage of DC power supply 10b which is likely to change in voltage by shifting the electric power balance between DC power supplies 10a and 10b, or by producing electric power circulation. When circulation power value Pr is set at a positive value, electric power Pa of DC power supply 10a is shifted in the positive direction (in the direction of discharging), while electric power Pb of DC power supply 10b is shifted in the negative direction (in the direction of charging). Therefore, when the voltage of DC power supply 10b is to be increased, Pr is set at a positive value larger than 0. In contrast, when circulation power value Pr is set at a negative value, electric power Pa is shifted in the negative direction, while electric power Pb is shifted in the positive direction. Therefore, when the voltage of DC power supply 10b is to be decreased, Pr is set at a negative value smaller than 0. When there is no necessity to adjust the voltage of DC power supply 10b, Pr is set at 0.

A power upper limit value setting unit 720 sets power upper limit values Pamax and Pbmax based on the condition of DC power supplies 10a and 10b. Each power upper limit value indicates the upper limit value of discharging electric power, and is set at 0 or a positive value. When a power upper limit value is set at 0, it means that discharging from a corresponding DC power supply is prohibited. For example, power upper limit value Pamax can be set based on SOCa and temperature Ta of DC power supply 10a. Power upper limit value Pbmax can also be set based on the condition of DC power supply 10b (SOCb, Tb, Ib, and Vb), similarly to Pamax.

A power lower limit value setting unit 730 sets power lower limit values Pamin and Pbmin based on the condition of DC power supplies 10a and 10b. Each power lower limit value indicates the upper limit value of charging electric power, and is set at 0 or a negative value. When a power lower limit value is set at 0, it means that charging of a corresponding DC power supply is prohibited. For example, power lower limit value Pamin is set based on SOCa and temperature Ta of DC power supply 10a. Power lower limit value Pbmin can also be set based on the condition of DC power supply 10b (SOCb, Tb, Ib, and Vb), similarly to Pamin.

It is noted that power upper limit value PHmax (PHmax=Pamax+Pbmax) and power lower limit value PHmin (PHmin=Pamin+Pbmin) of total electric power PH of DC power supplies 10a and 10b as a whole can be set in accordance with power upper limit values Pamax and Pbmax. The operation command for load 30 is restricted such that load power command value PL* falls within the range where PHmin≤PL*≤PHmax holds. Accordingly, load 30 can be operated without causing overcharge and overdischarge of DC power supplies 10a and 10b.

Figure 22:
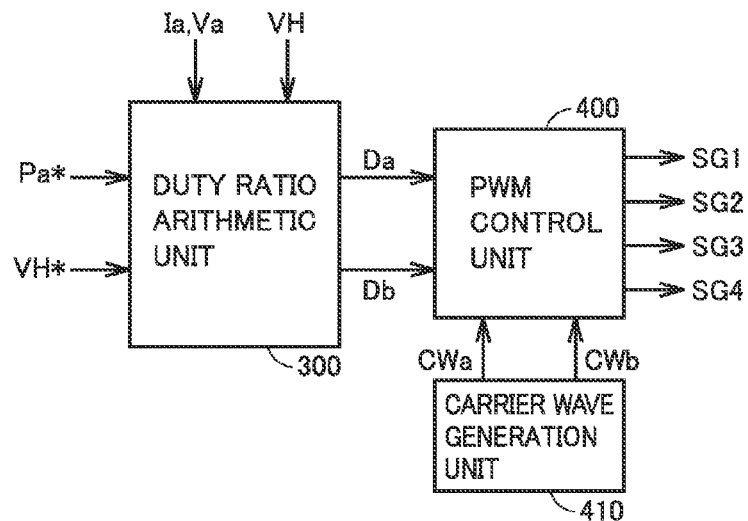
FIG. 22 is a functional block diagram for describing a control configuration of the power converter in accordance with an operation command value from a converter command generation unit shown in FIG. 21.

FIG. 22 is a functional block diagram for describing a control configuration of power converter 50 in accordance with an operation command value from converter command generation unit 700.

Referring to FIG. 22, a duty ratio arithmetic unit 300 calculates duty ratios Da and Db in Expressions (1) and (2) by feedback control of electric power Pa (voltage Va and electric current Ia) of DC power supply 10a and output voltage VH in accordance with power command value Pa* and voltage command value VH* set by converter command generation unit 700.

As described above, in the PB mode, by setting a current command value Ia* for a DC power supply subjected to electric current control (here, DC power supply 10a) such that Ia*=Pa*/Va holds, electric power Pa can be controlled to assume power command value Pa* by calculation of duty ratio Da by feedback control of electric current Ia.

On the other hand, for a DC power supply subjected to voltage control (here, DC power supply 10b), output voltage VH can be controlled to assume voltage command value VH* by calculation of duty ratio Db by feedback control of output voltage VH.

A PWM control unit 400 generates control signals SG1 to SG4 for switching elements S1 to S4 by pulse width modulation control based on duty ratios Da and Db set by duty ratio arithmetic unit 300 as well as carrier waves CWa and CWb received from a carrier wave generation unit 410. The pulse width modulation control and generation of control signals SG1 to SG4 conducted by PWM control unit 400 are executed similarly as described with reference to FIGS. 9 and 10, and therefore, detailed description thereof will not be repeated.

Accordingly, output voltage VH can be subjected to feedback control to assume voltage command value VH*, and electric power Pa of DC power supply 10a can be subjected to feedback control to assume power command value Pa*. Electric power Pb of DC power supply 10b can also be controlled such that Pb=PL*−Pa* holds as a result of controlling output of DC power supply 10a in accordance with voltage command value Pa* and controlling output of DC power supply 10b in accordance with voltage command value VH.

It is noted that in the aB mode and bB mode, only voltage control in accordance with voltage command value VH* is executed. That is, control signals SG1 to SG4 are generated such that only one of duty ratios Da and Db is calculated based on output voltage VH and voltage command value VH*, while the boost chopper circuit shown in FIG. 7 or 8 is controlled by pulse width modulation control based on carrier wave CWa or CWb. Therefore, voltage Va or Vb of DC power supply 10a or 10b used is increased or decreased in accordance with total electric power PH associated with voltage control.

Referring again to FIG. 21, operation mode selection unit 600 basically selects an operation mode in accordance with the condition of load 30 (VHreq, PL*) and the conditions of DC power supplies 10a and 10b.

Converter command generation unit 700 sets voltage command value VH* in accordance with the operation mode. Basically, in the PB mode, SB mode, aB mode, and bB mode in which the output voltage control by means of switching control is executed, voltage command value VH* is set in accordance with load request voltage VHrq. On the other hand, in the SD mode, PD mode, aD mode, and bB mode, output voltage VH is determined uniquely by voltage Va and/or voltage Vb, as shown in FIG. 3. Therefore, in these direct connection modes, voltage command value VH* can be set at a voltage value in accordance with voltage Va and/or voltage Vb in each mode.

Furthermore, in the PB mode, converter command generation unit 700 can control the power distribution ratio between DC power supplies 10a and 10b by setting power command value Pa* appropriately. For example, the power distribution ratio is preferably set such that the power losses of power converter 50 and DC power supplies 10a, 10b are reduced in accordance with the conditions of DC power supplies 10a, 10b and load power (PL*).

Voltage adjustment control unit 710 controls on/off of voltage adjustment flag Fvb based on the comparison between voltage Va+Vb and voltage command value VH*. For example, when the voltage difference (|Va+Vb−VH*|) between Va+Vb and VH* is larger than given determination value Vt, voltage adjustment flag Fvb is turned on, and when |Va+Vb−VH*|≤Vt holds, voltage adjustment flag Fvb is turned off. Determination value Vt is set such that it can be detected that Va+Vb has been substantially matched with VH*.

It is noted that voltage adjustment flag Fvb is composed of a plurality of bits, and is thus generated so as to further include information about the high/low between Va+Vb and VH*. That is, voltage adjustment flag Fvb shall be able to instruct which of the voltage adjustment control for increasing Va+Vb (when Va+Vb<VH* holds) and the voltage adjustment control for decreasing Va+Vb (when Va+Vb>VH* holds) to be executed.

It is noted that execution and non-execution of the voltage adjustment control can also be controlled by further combining the conditions of load 30 and DC power supplies 10a, 10b, in addition to the voltage difference between Va+Vb and VH*. For example, by permitting execution of the voltage adjustment control only when a predetermined requirement is met, it is possible not to execute the voltage adjustment control irrespective of the voltage difference when the predetermined requirement is not met. Although the predetermined requirement can be set freely, it is preferable to permit execution of the voltage adjustment control in accordance with the traveling condition of an electric-powered vehicle when, for example, load 30 includes motor-generator 35 of the electric-powered vehicle. It is also preferable not to execute the voltage adjustment control when the voltage difference between Va+Vb and VH* is excessively large.

When the voltage adjustment control is not executed, that is, when voltage adjustment flag Fvb is off, operation mode selection unit 600 and converter command generation unit 700 generate mode selection signal MD, voltage command value VH* and power command value Pa* (PB mode) in accordance with the above-described basic control. When voltage adjustment flag Fvb is off, the circulation power value is set at zero (Pr=0).

When the voltage adjustment control is executed, that is, when voltage adjustment flag Fvb is on, the operations of operation mode selection unit 600 and converter command generation unit 700 are corrected as follows.

When the voltage adjustment control is executed (when the voltage adjustment flag is on), operation mode selection unit 600 basically selects the PB mode for controlling power distribution between DC power supplies 10a and 10b. When executing the voltage adjustment control for increasing Va+Vb in the PB mode, converter command generation unit 700 sets power command value Pa* so as to promote charging of DC power supply 10b. In this case, since the setting has been made such that Pr>0 holds, power command value Pa* is set as shifted to the discharging side with respect to the time when the voltage adjustment control is not executed. However, power command value Pa* is set to fall within the range of Pamin≤Pa*≤Pamax.

During the powering operation of load 30 (PL*>0), by setting such that Pa*>PL* holds in accordance with circulation power value Pr, voltage Vb of DC power supply 10b can be promptly increased by means of power circulation.

On the other hand, during the regeneration operation of load 30 (PL*<0), voltage Vb+Vb can be increased by intensively charging DC power supply 10b by setting power command value Pa* so as to reduce the ratio of Pa* to PL*. Furthermore, by setting such that Pa*>0 holds in accordance with circulation power value Pr, voltage Vb of DC power supply 10b can be promptly increased involving power circulation.

When executing the voltage adjustment control for decreasing Va+Vb in the PB mode, converter command generation unit 700 sets power command value Pa* so as to promote discharging of DC power supply 10b. In this case, since the setting has been made such that Pr<0 holds, power command value Pa* is set as shifted to the charging side with respect to the time when the voltage adjustment control is not executed. Power command value Pa* is always set to fall within the range of Pamin≤Pa*≤Pamax.

During the powering operation of load 30 (PL*>0), voltage Vb+Vb can be decreased by intensively discharging DC power supply 10b by setting power command value Pa* so as to reduce the ratio of Pa* to PL*. Furthermore, by setting such that Pa*<0 holds in accordance with circulation power value Pr, voltage Vb of DC power supply 10b can be promptly decreased by means of power circulation.

On the other hand, during the regeneration operation of load 30 (PL*<0), by setting such that Pa*<PL* holds in accordance with circulation power value Pr, voltage Vb of DC power supply 10b can be promptly decreased by means of power circulation.

Moreover, in the PB mode, even where load power command value PL*=0 holds, the voltage adjustment control can be executed by setting circulation power value Pr. Specifically, by setting such that Pr>0 holds, the voltage adjustment control for increasing Va+Vb can be executed by the charging/discharging between DC power supplies 10a and 10b even when PL*=0 holds. Similarly, by setting such that Pr<0 holds, the voltage adjustment control for decreasing Va+Vb can be executed.

Converter command generation unit 700 can select the bB mode when executing the voltage adjustment control without using DC power supply 10a. However, since power circulation cannot be performed when the bB mode is selected, the direction of change (increase/decrease) of Va+Vb is determined by load power command value PL* and voltage command value VH*. Therefore, in the bB mode, the voltage adjustment control for increasing Va+Vb can be executed only during the regeneration operation of load 30 (PL*<0) or when output voltage VH is decreased (VH>VH*). Similarly, the voltage adjustment control for decreasing Va+Vb can be executed only during the powering operation of load 30 (PL*>0) or when output voltage VH is increased (VH<VH*).

It is noted that, in principle, the voltage adjustment control of varying Va+Vb toward VH* can also be executed by increasing or decreasing voltage Va by selecting the aB mode. For example, when it is difficult to vary voltage Vb in such a direction that Va+Vb is matched with VH* because of restrictions on SOC, temperature or the like of DC power supply 10b, the voltage adjustment control may be executed by selecting the aB mode to vary voltage Va of DC power supply 10a. However, since the amount of voltage change caused by charging/discharging of the same amount of electric power is larger in voltage Vb than in voltage Va, the voltage adjustment control can be executed efficiently by varying voltage Vb preferentially in a normal condition.

With the power converter control according to the present first embodiment as described above, power converter 50 can be controlled so as to combine the output voltage control for controlling output voltage VH in accordance with voltage command value VH* set depending on the load condition and the voltage adjustment control for matching the sum (Va+Vb) of the voltages of DC power supplies 10a and 10b with voltage command value VH*. Particularly, the voltage adjustment control can be executed efficiently by varying the voltage of DC power supply 10b whose voltage changes largely in such a direction to be matched with voltage command value VH*.

As a result of the voltage adjustment control, the SD mode (series direct connection mode) in which the loss of power converter 50 is suppressed can be applied at output voltage VH in correspondence with the load condition. Accordingly, the operation mode selection can be controlled to improve the overall efficiency of the power supply system.

Furthermore, when in the PB mode, Va+Vb can be promptly matched with voltage command value VH* by combining the power circulation between DC power supplies 10a and 10b. Particularly when power circulation is used, the voltage adjustment control can be executed such that Va+Vb is varied in any direction, regardless of positive/negative of load power PL (power traveling/regeneration).

Also when it is difficult to cause a voltage change for the voltage adjustment control in one of DC power supplies 10a and 10b, the voltage adjustment control can be executed such that only one of voltages Va and Vb is varied by applying the aB mode or the bB mode.

Second Embodiment

When bringing the state where VH>Va+Vb holds into the state where VH=Va+Vb holds by the voltage adjustment control described in the first embodiment, a concern arises in that the recovery capability of regenerative power from load 30 may be reduced because of the increase in voltage Vb. Particularly, when power supply system 5 is mounted on an electric-powered vehicle as illustrated in FIG. 2, recovery of regenerative power from motor-generator 35 during vehicle traveling largely influences the energy efficiency of the electric-powered vehicle. That is, taking the application to an electric-powered vehicle into consideration, if the voltage adjustment control is executed uniformly, energy efficiency may be deteriorated on the contrary because of the decrease in the recovered amount of regenerative energy.

The second embodiment will describe the voltage adjustment control depending on the traveling situation in the case where power supply system 5 according to the first embodiment is mounted on an electric-powered vehicle. The voltage adjustment control during high-speed traveling will be described below as an example.

Figure 23:
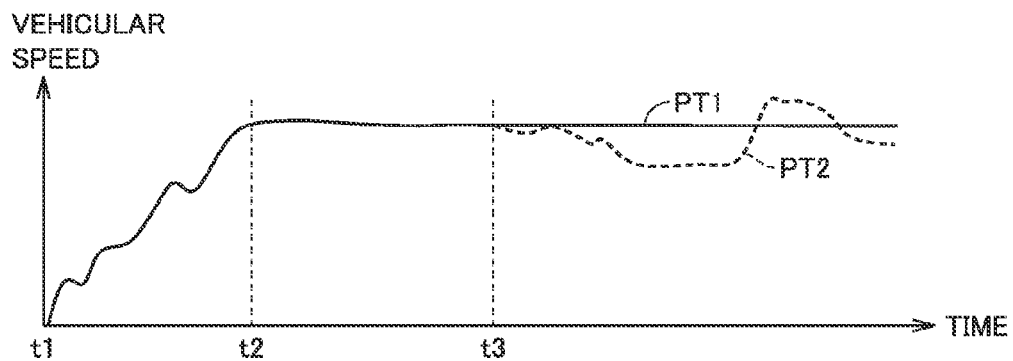
FIG. 23 is a conceptual view describing an example of high-speed traveling patterns of an electric-powered vehicle.

FIG. 23 is a conceptual view describing an example of high-speed traveling patterns of an electric-powered vehicle.

Referring to FIG. 23, the electric-powered vehicle starts traveling at time t1, and at time t2, is brought into a high-speed cruising condition where the high-speed traveling at a substantially constant vehicular speed is continued.

In a traveling pattern PT1 indicated by the solid line in FIG. 23, traveling at a speed equivalent to that at time t2 to t3 continues after time t3. That is, in traveling pattern PT1, high-speed cruising is continued for a long time. For example, traveling pattern PT1 appears when traveling down a highway for a long time. On the other hand, in traveling pattern PT2 indicated by the solid line in FIG. 23, high-speed cruising is terminated at time t3, and traveling involving acceleration/deceleration is performed. Therefore, traveling pattern PT2 indicates a traveling situation in which high-speed cruising is terminated in a relatively short time after the start of high-speed traveling.

In this way, high-speed traveling of the electric-powered vehicle is classified as either traveling pattern PT1 or PT2 depending on the length of the duration of high-speed cruising.

Here, SOCb is expressed by Expression (5) below when DC power supply 10b is implemented by a capacitor.

$$SOCb=(½) \times C \times Vb2 \tag{5}$$

Therefore, when voltage Vb rises to increase SOCb, regenerative energy that can be recovered by charging of DC power supply 10b decreases. Contrarily, when voltage Vb drops to decrease SOCb, regenerative energy that can be recovered by charging of DC power supply 10b increases.

Therefore, in the case where vehicle deceleration as in traveling pattern PT2 occurs, it is advantageous that voltage Vb is lower, in terms of recovery of regenerative energy. Since the kinetic energy of the vehicle is large particularly during high-speed traveling, the regenerative energy obtained by regenerative braking also increases.

On the other hand, when the rotation speed of motor-generator 35 also increases during high-speed traveling, load loss Pld tends to be increased. Therefore, during high-speed cruising in which high-speed traveling is continued for a long time, it is desirable to apply the SD mode in the state of VH=VHrq to thereby increase the energy efficiency of the electric-powered vehicle.

However, during high-speed traveling, load request voltage VHrq is also increased following the increase in rotation speed of motor-generator 35. Therefore, a concern arises in that, when Va+Vb is matched with VH* (VH*=VHrq) by the voltage adjustment control, the recovered amount of regenerative energy during deceleration is reduced because of the increase in voltage Vb.

Therefore, in traveling pattern PT1 in which high-speed cruising is continued for a long time, it is important to increase the energy efficiency in high-speed cruising. That is, the merit in increasing the energy efficiency in high-speed cruising by applying the voltage adjustment control exceeds the demerit that the recovered amount of regenerative energy is reduced because of the increase in Vb caused by the voltage adjustment control.

On the other hand, in traveling pattern PT2 in which a high-speed traveling state is terminated in a relatively short time (time t2 to t3), the merit in increase the efficiency of high-speed cruising by applying the voltage adjustment control is small. Thus, it is more advantageous to ensure the recovered amount of regenerative energy during deceleration without executing the voltage adjustment control so as not to increase voltage Vb.

In this way, the voltage adjustment control is preferably executed when it is predicted that high-speed cruising is continued for a long time. Therefore, in the second embodiment, the necessity of the voltage adjustment control described in the first embodiment is determined based on prediction of the traveling pattern as to whether or not high-speed cruising is continued for a long time.

Figure 24:
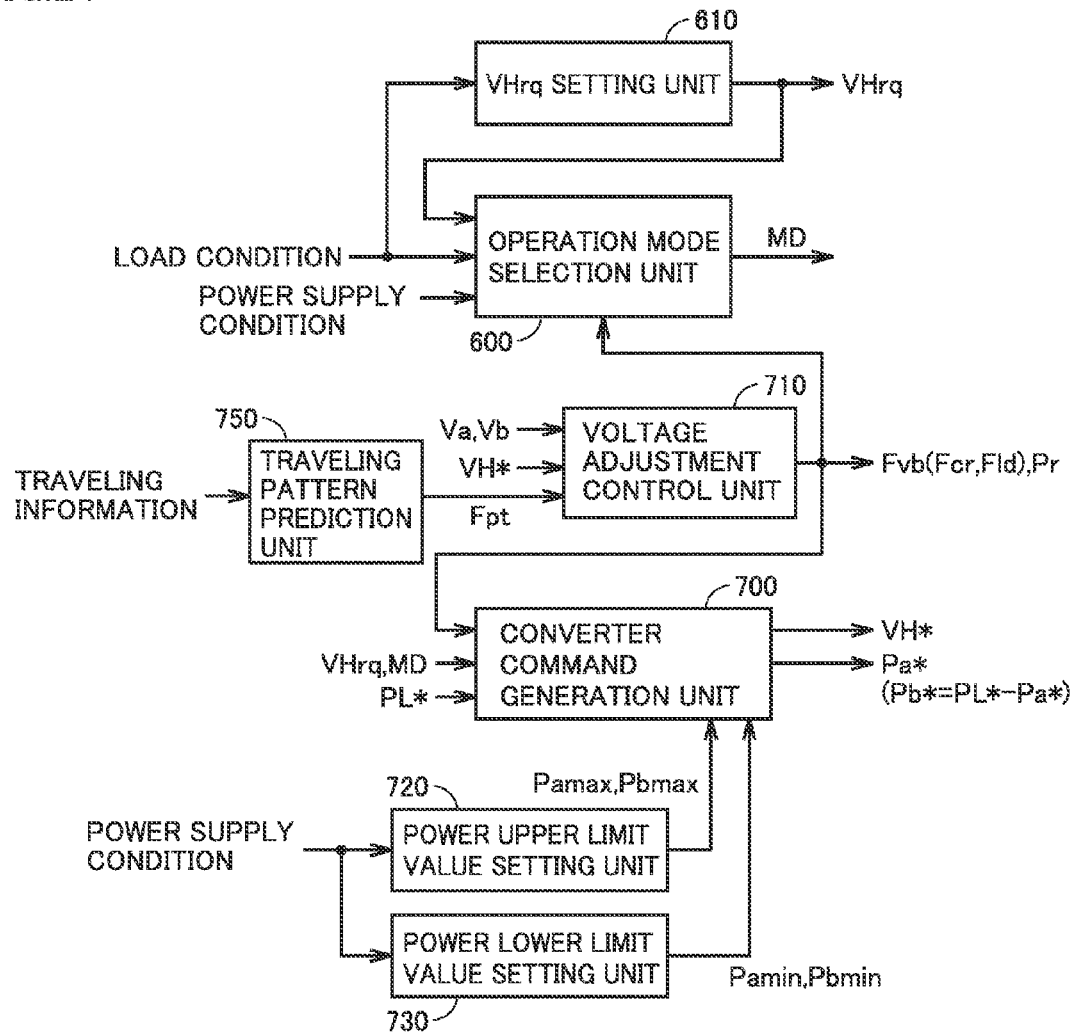
FIG. 24 is a functional block diagram for describing a control configuration related to voltage adjustment control by power converter control according to a second embodiment.

FIG. 24 is a functional block diagram for describing a control configuration related to voltage adjustment control by power converter control according to the present second embodiment.

Comparing FIG. 24 with FIG. 19, in the control configuration according to the second embodiment, a traveling pattern prediction unit 750 is further provided. Traveling pattern prediction unit 750 acquires traveling information for predicting a traveling pattern from map information and traffic congestion information in a navigation system, or by learning based on an accumulated traveling history in the past, or the like.

Traveling pattern prediction unit 750 generates a voltage adjustment permission flag Fpt based on the acquired traveling information. Voltage adjustment permission flag Fpt is turned on in the case where it is in a traveling situation in which the voltage adjustment control should be applied, and is turned off in the case where it is not in the traveling situation in which the voltage adjustment control should be applied.

As an example, as described with reference to FIG. 23, before the entry into a highway (prior to time t2), traveling pattern prediction unit 750 predicts in which of traveling patterns PT1 and PT2 high-speed traveling is performed based on the traveling information (map information, destination setting, route searching results, etc.) acquired by the navigation system. Traveling pattern prediction unit 750 turns on voltage adjustment permission flag Fpt when traveling pattern PT1 is predicted, and turns off voltage adjustment permission flag Fpt when traveling pattern PT2 is predicted. Voltage adjustment control unit 710 generates voltage adjustment flag Fvb based on voltage adjustment permission flag Fpt received from traveling pattern prediction unit 750. Specifically, voltage adjustment control unit 710 turns on voltage adjustment flag Fvb in accordance with the comparison of the voltage difference between Va+Vb and VH* (|Va+Vb−VH*|) with determination value Vt, similarly to the first embodiment. That is, when |Va+Vb−VH*|≤Vt holds, voltage adjustment flag Fvb is turned off. On the other hand, voltage adjustment control unit 710 turns off voltage adjustment flag Fvb when voltage adjustment permission flag Fpt is off.

Furthermore, in the second embodiment, when voltage adjustment flag Fvb is on, that is, when the voltage adjustment control is executed, a flag Fcr for instructing the voltage adjustment control involving power circulation and a flag Fpl for instructing the voltage adjustment control utilizing the traveling load (i.e., load power associated with powering or regeneration) without involving power circulation are turned on selectively. Flags Fcr and Fpl are reflected in the operation mode selection performed by operation mode selection unit 600 and setting of power command value Pa* performed by converter command generation unit 700.

The configuration and function of remaining units shown in FIG. 24 are similar to those shown in FIG. 21, and description thereof will not be repeated.

Figures 25, 26:
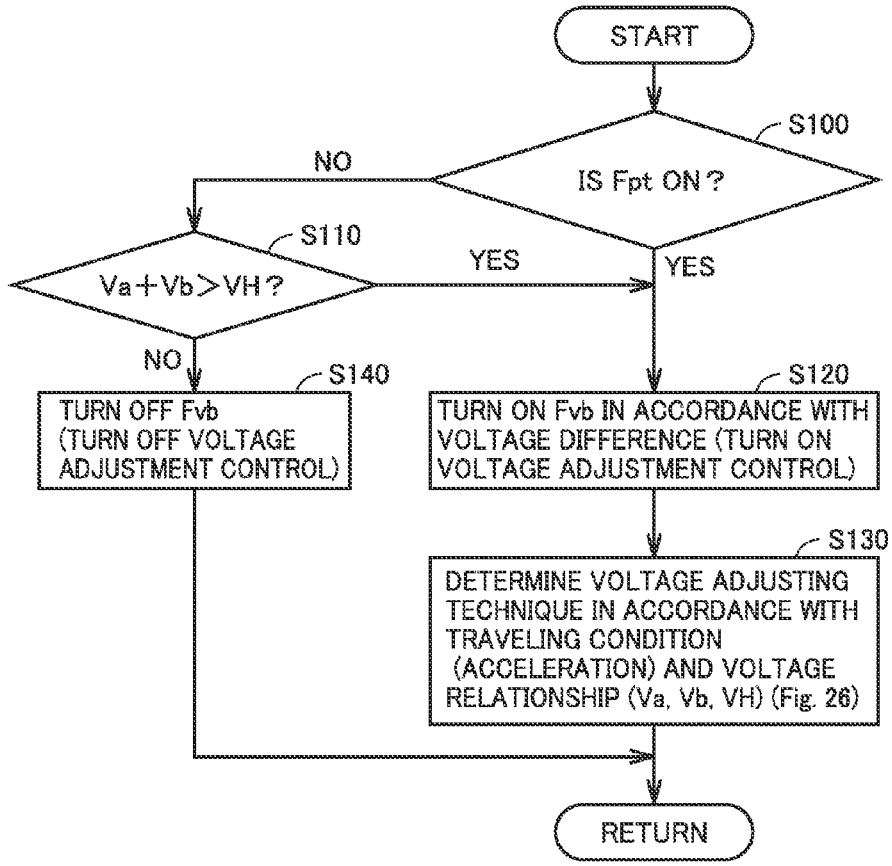
FIG. 25 is a flowchart for describing control processing for voltage adjustment control in which a voltage adjustment permission flag based on traveling information has been reflected.
FIG. 26 is a table for describing selectable setting of a voltage adjusting technique in the voltage adjustment control.

FIG. 25 is a flowchart for describing control processing for voltage adjustment control in which voltage adjustment permission flag Fpt in accordance with the traveling situation has been reflected. The control processing shown in FIG. 25 is achieved by control device 40 executing a program stored previously.

Referring to FIG. 25, in step S100, control device 40 determines whether or not voltage adjustment permission flag Fpt is on. When voltage adjustment permission flag Fpt is on (the YES determination is made in S100), the process is advanced to step S120.

In step S120, control device 40 turns on the voltage adjustment control in accordance with the voltage difference between Va+Vb and VH*. That is, voltage adjustment flag Fvb is turned on when |Va+Vb−VH*|>Vt holds. On the other hand, when |Va+Vb−VH*|≤Vt holds, voltage adjustment flag Fvb is turned off so that the voltage adjustment control is not executed.

When the voltage adjustment control is executed, in step S130, control device 40 selectively sets a voltage adjustment technique in accordance with the traveling condition and voltage relationship.

FIG. 26 is a table for describing selectable setting of a voltage adjusting technique in the voltage adjustment control.

Referring to FIG. 26, a voltage adjusting technique is selected in accordance with the relationship between voltage Va+Vb and voltage command value VH* and in accordance with whether the electric-powered vehicle is accelerating or decelerating.

During acceleration of the electric-powered vehicle, DC power supply 10b can be discharged by supplying load power (PL>0). That is, when VH<Va+Vb holds, voltage Vb can be efficiently decreased by discharging DC power supply 10b utilizing the traveling load. Therefore, during acceleration of the electric-powered vehicle and when VH<Va+Vb holds, flag Fpl is turned on so as to execute the voltage adjustment control utilizing the traveling load. At this time, either the PB mode or the bB mode can be applied as the operation mode.

Contrarily, when VH>Va+Vb holds, power circulation is required for the voltage adjustment control since voltage Vb cannot be increased utilizing the traveling load. In this case, power circulation for charging DC power supply 10b can be produced by setting such that power command value Pa* for DC power supply 10a is larger than PL. Therefore, during acceleration of the electric-powered vehicle and when VH>Va+Vb holds, flag Fcr is turned on so as to execute the voltage adjustment control involving power circulation. At this time, the operation mode needs to be set at the PB mode. However, a concern arises in that the efficiency is reduced during power circulation since a power loss occurs within power converter 50 aside from supply of load power PL.

During deceleration of the electric-powered vehicle, DC power supply 10b can be charged with load power (PL<0). That is, when VH>Va+Vb holds, voltage Vb can be efficiently increased by charging DC power supply 10b utilizing the traveling load. Therefore, during deceleration of the electric-powered vehicle and when VH>Va+Vb holds, flag Fpl is turned on so as to execute the voltage adjustment control utilizing the traveling load. At this time, either the PB mode or the bB mode can be applied as the operation mode. Moreover, a setting is made such that Pr>0 holds.

Contrarily, when VH<Va+Vb holds, power circulation is required for the voltage adjustment control since voltage Vb cannot be decreased utilizing the traveling load. In this case, the power circulation for discharging DC power supply 10b can be produced by setting such that power command value Pa* for DC power supply 10a is smaller than PL. Therefore, during deceleration of the electric-powered vehicle and when VH<Va+Vb holds, flag Fcr is turned on so as to execute the voltage adjustment control involving power circulation. At this time, the operation mode needs to be set at the PB mode. Moreover, a setting is made such that Pr<0 holds.

In accordance with the selection of power adjusting technique shown in FIG. 26, the frequency of power circulation in the power adjustment control can be suppressed by taking full advantage of the traveling load to increase or decrease voltage Vb. Accordingly, the power loss in power converter 50 associated with the voltage adjustment control can be suppressed. It is therefore possible to increase the energy efficiency of power supply system 5 and the electric-powered vehicle as a whole.

Referring again to FIG. 25, when the voltage adjustment control is executed, control device 40 selects an operation mode in accordance with the voltage adjusting technique selected in step S130 (operation mode selection unit 600), and generates an operation command for power converter 50 (converter command generation unit 700).

When voltage adjustment permission flag Fpt is off (when the NO determination is made in S100), control device 40 basically advances the process to step S140 not to execute the voltage adjustment control. That is, even if |Va+Vb−VH*|>Vt holds, voltage adjustment flag Fvb is turned off.

However, paying attention to recovery of regenerative energy, it is advisable to decrease voltage Vb if possible. Therefore, when voltage adjustment permission flag Fpt is off (when the NO determination is made in S100), control device 40 preferably compares voltage Va+Vb with voltage command value VH* in step S110. Then, when VH<Va+Vb holds (when the YES determination is made in S110), control device 40 advances the process to step S120 even if voltage adjustment permission flag Fpt is off. Accordingly, the voltage adjustment control for decreasing Vb can be executed positively when VH<Va+Vb holds. Thus, it can be expected to increase the recovered amount of regenerative energy during vehicle traveling.

In accordance with the control processing shown in FIG. 25, by executing the voltage adjustment control when traveling pattern PT1 shown in FIG. 23 is predicted on the occasion of high-speed traveling, high-speed cruising can be performed with the SD mode (series direct connection mode) being applied at output voltage VH corresponding to the load condition. Accordingly, the loss of power supply system 5 in high-speed cruising continued for a relatively long time is reduced. Thus, the energy efficiency of the electric-powered vehicle can be increased.

On the other hand, when traveling pattern PT2 shown in FIG. 23 is predicted, the voltage adjustment control for increasing voltage Vb is not executed. Accordingly, the energy efficiency of the electric-powered vehicle can be increased by giving priority to increasing the recovered amount of regenerative energy during deceleration to reducing the loss during high-speed cruising in correspondence with that high-speed cruising is terminated in a relatively short time.

It is noted that although the second embodiment has described controlling execution and non-execution of the voltage adjustment control during high-speed traveling, it is not limited to high-speed traveling, but it is also possible to perform similar control based on a traveling situation in other scenes. That is, the setting of on/off of voltage adjustment permission flag Fpt based on traveling information can be made freely.

In this way, with the power converter control according to the second embodiment, execution and non-execution of the voltage adjustment control can be appropriately controlled in accordance with the traveling situation in correspondence with the case where the power supply system is applied to an electric-powered vehicle. That is, power converter 50 can be controlled such that the decrease in the recovered amount of regenerative energy as a result of the voltage adjustment control will not reduce the total energy efficiency through traveling.

It is noted that by executing the voltage adjustment control positively in the situation where VH<Va+Vb holds, the energy efficiency can be increased by both the increase in application frequency of the SD mode and the increase in the recovered amount of regenerative energy.

Third Embodiment

The third embodiment will describe a preferable variation of the power converter control for controlling the outputs of DC power supplies 10a and 10b to which the power adjustment control described in the first and second embodiments is applied. Particularly, the control in the PB mode to which power circulation can be applied will be described.

Figure 27:
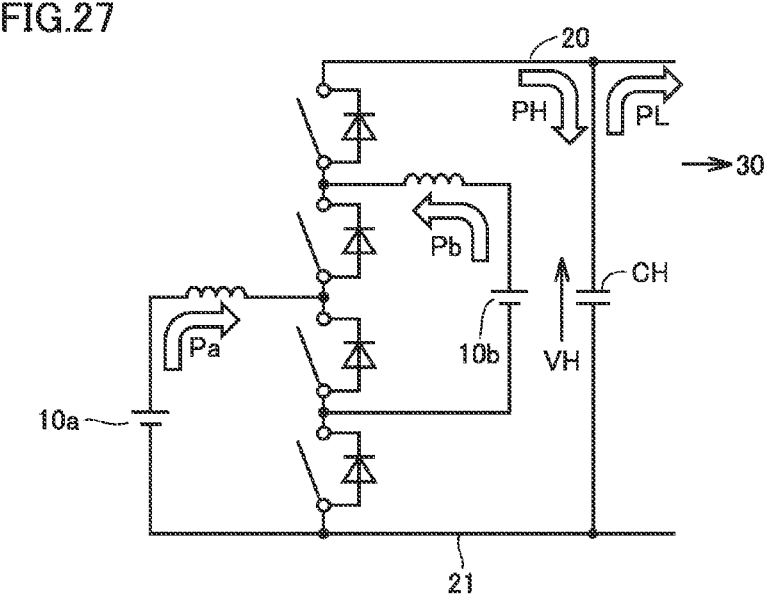
FIG. 27 is a drawing describing a basic concept of power converter control according to a third embodiment.

FIG. 27 is a drawing describing a basic concept of power converter control according to the third embodiment.

Referring to FIG. 27, output voltage VH increases in the state where total electric power PH is larger than load power PL (PH>PL), while decreases in the state where PH<PL holds. Therefore, in the power converter control according to the present third embodiment, the command value for total electric power PH is set in accordance with voltage deviation ΔVH of output voltage VH from voltage command value VH*. Furthermore, by distributing total electric power PH between electric power Pa and electric power Pb, the output of each of DC power supplies 10a and 10b is subjected to power control (current control).

(Control Operation in PB Mode)

First, the power converter control in the PB mode which is mainly used during the voltage adjustment control and in which power distribution can be controlled will be described.

Figure 28:
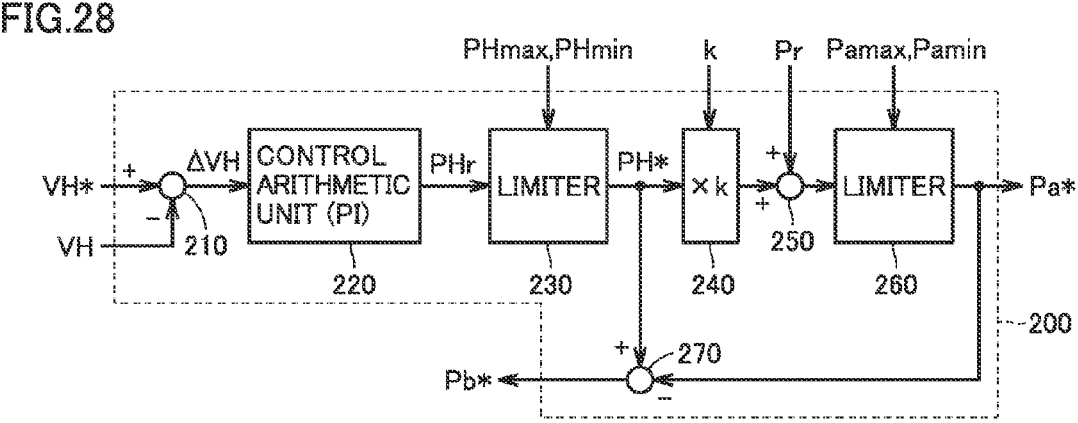
FIG. 28 is a first block diagram for describing power converter control according to the third embodiment.
Figure 29:
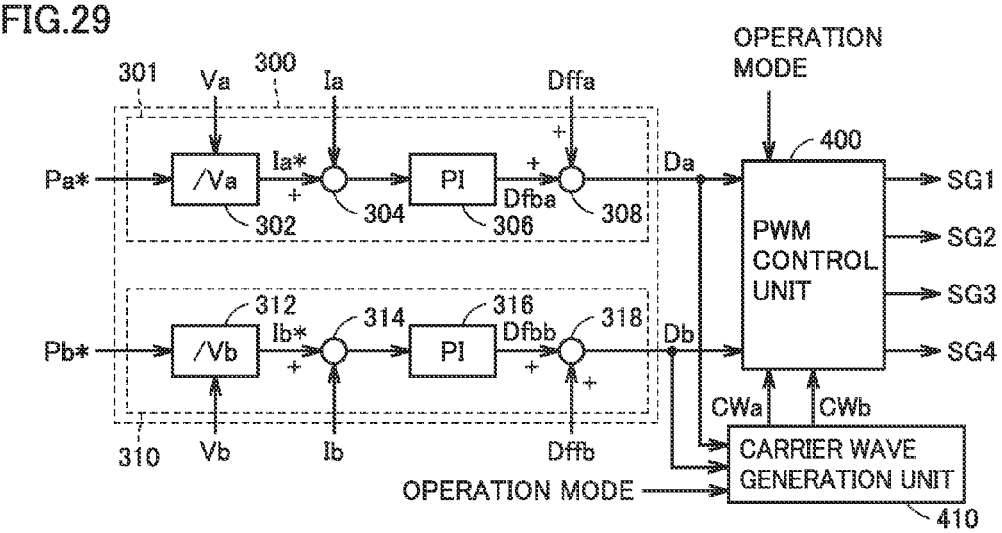
FIG. 29 is a second block diagram for describing the power converter control according to the third embodiment.

FIGS. 28 and 29 are block diagrams for describing power converter control according to the third embodiment. FIG. 28 shows a configuration for a control calculation for setting a power command value for each DC power supply, and FIG. 29 shows a configuration for a control calculation for controlling the output of each DC power supply in accordance with the set power command value.

Referring to FIG. 28, voltage control unit 200 sets power command values Pa* and Pb* for DC power supplies 10a and 10b, based on the voltage deviation of output voltage VH. Voltage control unit 200 has a deviation arithmetic unit 210, a control arithmetic unit 220, a limiter 230, a power distribution unit 240, a circulation power addition unit 250, a limiter 260, and a subtraction unit 270.

Deviation arithmetic unit 210 calculates voltage deviation ΔVH (ΔVH=VH*−VH) in accordance with the difference between voltage command value VH* and a detected value of output voltage VH. Control arithmetic unit 220 calculates total electric power PHr required for voltage control, based on voltage deviation ΔVH. For example, control arithmetic unit 220 sets PHr by a PI operation in accordance with Expression (6) below.

$$PHr = Kp \cdot \Delta VH + \Sigma(Ki \cdot \Delta VH) \quad (6)$$

In Expression (6), Kp is a proportional control gain, and Ki is an integral control gain. A capacitance value of smoothing capacitor CH is also reflected in these control gains. By setting total electric power PHr in accordance with Expression (6), feedback control for reducing voltage deviation ΔVH can be achieved. Alternatively, it is also possible to set total electric power PHr requested in accordance with Expression (7) reflecting load power command value PL* predicted in accordance with the operating condition of load 30 and the operation command value. Then, output voltage VH can be controlled in such a manner as to provide feedforward of power consumption in load 30.

$$PHr = Kp \cdot \Delta VH + \Sigma(Ki \cdot \Delta VH) + PL^* \quad (7)$$

Limiter 230 limits power command value PH* so as to fall within the range of PHmax to PHmin. If PHr>PHmax holds, limiter 230 sets PH* at PHmax. Similarly, when PHr<PHmim holds, limiter 230 sets PH* at PHmin. When PHmax≥PHr≥PHmin holds, PH* is set at PHr as it is. Total electric power command value PH* is thereby settled.

Power distribution unit 240 calculates electric power k·PH* for which DC power supply 10a is responsible, based on total electric power command value PH* and power distribution ratio k. Power distribution ratio k can be set in accordance with load power command value PL* such that the power losses of power converter 50 and DC power supplies 10a, 10b are reduced. For example, a map for uniquely determining power distribution ratio k in accordance with load power command value PL* is previously created.

Circulation power addition unit 250 adds k·Pa* calculated by power distribution unit 240 and circulation power value Pr set by voltage adjustment control unit 710 to thereby calculate electric power Par required of DC power supply 10a (Par=k·Pa*+Pr).

Limiter 260 limits power command value Pa* for DC power supply 10a so as to fall within the range of Pamax to Pamin set by power upper limit value setting unit 720 and power lower limit value setting unit 730. If Par>Pamax holds, limiter 260 modifies Pa* to be Pamax. Similarly, when Par<Pamim holds, limiter 260 modifies Pa* to be Pamin. When Pamax≥Par≥Pamin holds, Pa* is set at Par as it is. Power command value Pa* for DC power supply 10a is thereby settled.

Subtraction unit 270 subtracts power command value Pa* from total electric power command value PH*, thereby setting power command value Pb* for DC power supply 10b (Pb*=PH*−Pa*).

Figure 30:
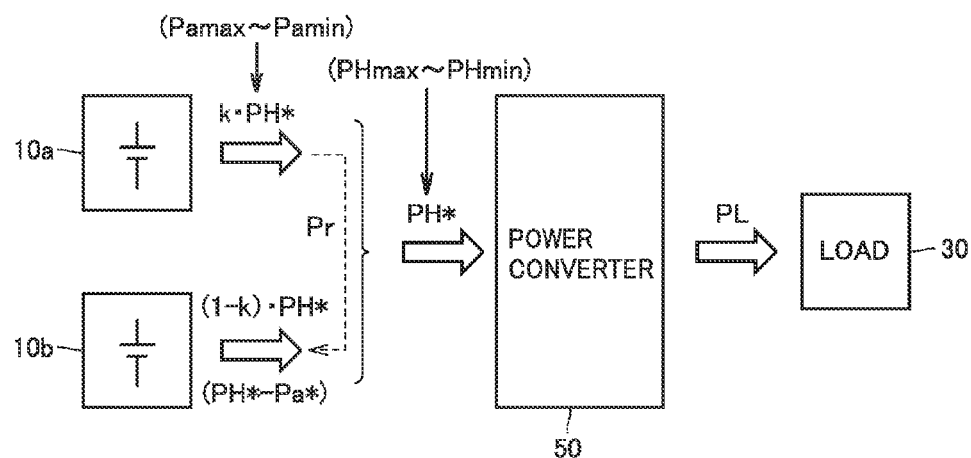
FIG. 30 is a conceptual view for describing a power flow in a power supply system in the PB mode by means of the power converter control according to the third embodiment.

FIG. 30 is a conceptual view for describing a power flow in the power supply system depending on the power command values set in accordance with FIG. 28.

Referring to FIG. 30, total electric power command value PH* necessary for controlling output voltage VH to be voltage command value VH* is distributed between power command values Pa* and Pb* in accordance with power distribution ratio k. That is, setting is basically made such that Pa*=k·PH and Pb*=(1−k)·PH* hold. Accordingly, upon controlling the power distribution between DC power supplies 10a and 10b, electric power in accordance with total electric power command value PH* for controlling output voltage VH can be input/output to/from electric power line 20.

Furthermore, by setting circulation power value Pr, DC power supply 10b is charged with output power of DC power supply 10a (Pr>0) or DC power supply 10a is charged with output power of DC power supply 10b (Pr<0), so that the voltage adjustment control by means of power circulation can be achieved.

Since power command value Pa* is reliably limited to fall within the range of Pamax to Pamin by limiter 260, DC power supply 10a can be protected from overpower. That is, overcharge and overdischarge of DC power supply 10a can be prevented. Moreover, by restricting load power PL to fall within the range of PHmin to PHmax as described above, DC power supply 10b can also be indirectly protected from overpower.

Referring again to FIG. 29, control device 40 includes duty ratio arithmetic unit 300, PWM control unit 400 and carrier wave generation unit 410, for controlling the outputs from DC power supplies 10a and 10b in accordance with power command values Pa* and Pb*. Duty ratio arithmetic unit 300 includes a current control unit 301 for controlling the output of DC power supply 10a by current control and a current control unit 310 for controlling the output of DC power supply 10b by current control.

Current control unit 301 has a current command generation unit 302, a deviation arithmetic unit 304, a control arithmetic unit 306, and an FF addition unit 308.

Current command generation unit 302 sets a current command value Ia* for DC power supply 10a based on power command value Pa* and a detected value of voltage Va (Ia*=Pa*/Va). Deviation arithmetic unit 304 calculates a current deviation ΔIa in accordance with the difference between current command value Ia* and a detected value of electric current Ia (ΔIa=Ia*−Ia). Control arithmetic unit 306 calculates a control amount Dfba for current feedback control based on current deviation ΔIa. For example, control arithmetic unit 306 calculates control amount Dfba by a PI operation in accordance with Expression (8) below.

$$Dfba = Kp \cdot \Delta Ia + \Sigma(Ki \cdot \Delta Ia) \qquad (8)$$

In Expression (8), Kp is a proportional control gain, and Ki is an integral control gain. These control gains are set independently of Expression (6).

On the other hand, an FF control amount Dffa for voltage feedforward control is set in accordance with Expression (9) in line with Da=(VH−Va)/VH obtained by solving Expression (1) for Da.

$$Dffa = (VH^* - Va)/VH^* \qquad (9)$$

FF addition unit 308 adds an FB control amount Dfba and FF control amount Dffa, thereby calculating duty ratio Da for power control of DC power supply 10a. Duty ratio Da corresponds to the duty ratio of a period during which the lower arm element (switching elements S3 and S4) of the boost chopper circuit (FIG. 7) is turned on when performing DC/DC conversion between voltage Va of DC power supply 10a and output voltage VH, similarly to Expression (1).

Similarly, current control unit 310 corresponding to DC power supply 10b has a current command generation unit 312, a deviation arithmetic unit 314, a control arithmetic unit 316, and an FF addition unit 318.

Current command generation unit 312 sets a current command value Ib* for DC power supply 10b based on power command value Pb* and a detected value of voltage Vb (Ib*=Pb*/Vb). Deviation arithmetic unit 314 calculates a current deviation ΔIb in accordance with the difference between current command value Ib* and a detected value of electric current Ib (ΔIb=Ib*−Ib). Control arithmetic unit 316 calculates a control amount Dfbb for current feedback control based on current deviation ΔIb. For example, control arithmetic unit 316 calculates control amount Dfbb by a PI operation in accordance with Expression (10) below.

$$Dfbb = Kp \cdot \Delta Ib + \Sigma(Ki \cdot \Delta Ib) \qquad (10)$$

In Expression (14), Kp is a proportional control gain, and Ki is an integral control gain. These control gains are set independently of Expressions (6) and (8).

On the other hand, an FF control amount Dffb for voltage feedforward control is set in accordance with Expression (11) in line with Db=(VH−Vb)/VH obtained by solving Expression (2) for Db. In Expression (11), voltage command value VH* may be a detected value of output voltage VH.

$$Dffb = (VH^* - Vb)/VH^* \qquad (11)$$

FF addition unit 318 adds FB control amount Dfbb and FF control amount Dffb, thereby calculating duty ratio Db for power control of DC power supply 10b. Duty ratio Db corresponds to the duty ratio of a period during which the lower arm element (switching elements S2 and S3) of the boost chopper circuit (FIG. 8) is turned on, similarly to Expression (2).

PWM control unit 400 generates control signals SG1 to SG4 for switching elements S1 to S4 by pulse width modulation control based on duty ratios Da and Db set by current control units 301 and 310 as well as carrier waves CWa and CWb received from carrier wave generation unit 410. The pulse width modulation control and generation of control signals SG1 to SG4 performed by PWM control unit 400 are executed similarly to those described with reference to FIGS. 9 and 10, and detailed description thereof will not be repeated.

With the power converter control according to the third embodiment as described above, in DC/DC conversion in the PB mode, the voltage deviation of output voltage VH is converted into power command values to perform current control on the outputs of respective DC power supplies 10a and 10b, so that output voltage VH can be controlled to be voltage command value VH*. Particularly because the charging/discharging electric power of DC power supplies 10a and 10b can be directly controlled reflecting circulation power value Pr for the voltage adjustment control, the power converter control according to the third embodiment is suitable for the combination with the power adjustment control described in the first and second embodiments.

The power conversion control according to the third embodiment is also applicable to the aB mode and bB mode which may be selected in the power adjustment control.

In the aB mode, bidirectional DC/DC conversion is executed between DC power supply 10a and electric power line 20 (load 30) by the boost chopper circuit formed by switching elements S1 to S4 by the switching operations shown at (a) and (b) of FIG. 7, without using DC power supply 10b. Therefore, in the aB mode, switching elements S1 to S4 are controlled in accordance with control pulse signal SDa based on duty ratio Da for controlling the output from DC power supply 10a. Specifically, on/off of switching elements S3 and S4 constituting the lower arm element of the boost chopper circuit shown at (a) and (b) of FIG. 7 is controlled in common in accordance with control pulse signal SDa. Similarly, on/off of switching elements S1 and S2 constituting the upper arm element of the boost chopper circuit is controlled in common in accordance with control pulse signal/SDa.

Referring again to FIG. 28, also in the aB mode, total electric power command value PH* is set by deviation arithmetic unit 210, control arithmetic unit 220 and limiter 230 based on voltage deviation $\Delta$VH of output voltage VH, similarly to the PB mode. Since DC power supply 10b is not used, power upper limit value PHmax and power lower limit value PHmin supplied to limiter 230 can be set to be equivalent to power upper limit value Pamax and power lower limit value Pamin of DC power supply 10a. Correspondingly, in the aB mode, the operation command value for load 30 is generated limitedly within the range where Pamin≤PL*≤Pamax holds.

Since DC power supply 10b is not used in the aB mode, Pr is fixed at 0. Furthermore, by fixing power distribution ratio k at 1.0, power command value Pa* is set at PH*, while power command value Pb* is set at 0. On this occasion, it is also possible to protect power command value Pa* by limiter 260 from falling outside the range of Pamax to Pamin, that is, to protect DC power supply 10a such that overpower is not produced therein. Therefore, in the aB mode, it is also possible to cause one of limiters 230 and 260 not to operate.

Furthermore, in the configuration of FIG. 29, the current feedback control is executed only for DC power supply 10a. That is, similarly to the PB mode, current control unit 301 calculates duty ratio Da by the feedback control indicated by Expression (6) based on the current deviation between current command value Ia* set in accordance with power command value Pa* and a detected value of electric current Ia as well as the feedforward control indicated by Expression (7) based on the voltage ratio (Da=Dfba+Dfba).

On the other hand, since control pulse signal SDb is unnecessary in the aB mode as described above, the operation of current control unit 310 can be stopped. That is, the calculation of duty ratio Db is stopped. Also in the aB mode, load power PL and power command value Pa* are reliably limited by limiter 260 and/or 290 to fall within the range of Pamax to Pamin. Accordingly, DC power supply 10a used alone can be protected from overpower. By calculating duty ratio Da by the feedback control of electric current Ia of DC power supply 10a in the aB mode, voltage deviation $\Delta$VH can be promptly cancelled as compared to the control for calculating duty ratio Da only by the feedback control of output voltage VH.

(Control Operation in bB Mode)

In the bB mode, bidirectional DC/DC conversion is executed between DC power supply 10b and load 30 by the boost chopper circuit formed by switching elements S1 to S4 by the switching operations shown at (a) and (b) of FIG. 8, without using DC power supply 10a. Therefore, in the bB mode, switching elements S1 to S4 are controlled in accordance with control pulse signal SDb based on duty ratio Db for controlling the output from DC power supply 10b. Specifically, on/off of switching elements S2 and S3 constituting the lower arm element of the boost chopper circuit shown at (a) and (b) of FIG. 8 is controlled in common in accordance with control pulse signal SDb. Similarly, on/off of switching elements S1 and S4 constituting the upper arm element of the boost chopper circuit is controlled in common in accordance with control pulse signal/SDb.

Referring again to FIG. 28, also in the bB mode, total electric power command value PH* is set based on voltage deviation $\Delta$VH of output voltage VH, similarly to the PB mode and aB mode. Since DC power supply 10a is not used in the bB mode, power upper limit value PHmax and power lower limit value PHmin supplied to limiter 230 can be set to be equivalent to power upper limit value Pbmax and power lower limit value Pbmin of DC power supply 10b. Similarly, circulation power value Pr is fixed at 0.

Furthermore, by fixing power distribution ratio k at 0, power command value Pb* is set at PH*, while power command value Pa* is set at 0. In this case, the limitation by limiter 260 is unnecessary. That is, in the bB mode, DC power supply 10b can be directly protected from overpower by limiter 230.

Furthermore, in the configuration of FIG. 29, the current feedback control is executed only for DC power supply 10b. That is, similarly to the PB mode, current control unit 310 calculates duty ratio Db by the feedback control indicated by Expression (8) based on the current deviation between current command value Ib* set in accordance with power command value Pb* and a detected value of electric current Ib as well as the feedforward control based on the voltage ratio indicated by Expression (9) (Db=Dfbb+Dfbb).

On the other hand, since control pulse signal SDa is unnecessary in the bB mode as described above, the operation of current control unit 301 can be stopped. That is, the calculation of duty ratio Da is stopped.

Also in the bB mode, power upper limit value PHmax and power lower limit value PHmin supplied to limiter 230 can be set to be equivalent to power upper limit value Pbmax and power lower limit value Pbmin of DC power supply 10b. Accordingly, power command value Pb* is reliably limited to fall within the range of Pbmax to Pbmin. In the bB mode, the operation command value for load 30 will be generated limitedly within the range where Pbmin≤PL≤Pbmax holds. As a result, DC power supply 10b used alone can be protected from overpower. By performing the feedback control of electric current Ib of DC power supply 10b in the bB mode, occurred voltage deviation $\Delta$VH can be promptly cancelled as compared to the control for directly cancelling DC voltage VH by feedback control.

In this way, with the power conversion control according to the third embodiment, even when the aB mode and bB mode are selected during execution of the voltage adjustment control, output voltage VH is controlled to be voltage command value VH* applying the control logic common to the PB mode, while electric power of DC power supply 10a or 10b can be controlled by current feedback. Particularly by subjecting the output of DC power supply 10a or 10b to current control, control response of output voltage VH can also be improved.

Although the present embodiment has illustrated power converter 50 which executes DC/DC conversion between two DC power supplies 10a, 10b and common electric power line 20, the application of the present invention is not limited to such a case. For example, to a configuration of a power supply system in which a power converter is provided across three or more DC power supplies and an electric power line, similar voltage adjustment control can be applied by means of charging/discharging between DC power supplies, among three or more DC power supplies, whose voltages change differently with respect to input/output of the same amount of electric power.

As to the configuration of the voltage converter, a circuit configuration different from power converter 50 can also be applied as long as it has an operation mode in which the state where a plurality of series power supplies are connected in series with the electric power line is maintained, while charging/discharging of the plurality of DC power supplies can be controlled individually in a mode other than that operation mode, similarly to the SD mode.

Furthermore, it is noted that since the first embodiment does not involve traveling pattern prediction, load 30 may be implemented by any device that operates with DC voltage VH. Specifically, although examples in which load 30 is configured so as to include a traction motor for an electric-powered vehicle have been described in the present specification, the application of the voltage adjustment control according to the first embodiment is not limited to a power supply system having such a load. Moreover, the configuration of the powertrain of an electric-powered vehicle illustrated as a load when mounted on the electric-powered vehicle is not limited to the example of FIG. 2. It is noted that the present invention is applicable without limiting the number and connection configuration of motor-generators as long as they produce vehicle driving force and braking force by means of transfer of electric power to/from the electric power line.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 5 power supply system; 10a, 10b DC power supply; 15 line; 20 electric power line; 21 ground line; 30 load; 32 inverter; 35 motor-generator; 36 motive power transmission gear; 37 driving wheel; 40 control device; 50 power converter; 101, 102 operating point; 110, 120 active region; 200 voltage control unit; 210, 304, 314 deviation arithmetic unit; 220, 306, 316 control arithmetic unit; 230, 260 limiter; 240 power distribution unit; 250 circulation power addition unit; 270 subtraction unit; 300 duty ratio arithmetic unit; 301, 310 current control unit; 302, 312 current command generation unit; 308, 318 addition unit; 350, 351, 360, 361, 370, 371, 372, 373, 374 electric current path; 400 PWM control unit; 410 carrier wave generation unit; 600 operation mode selection unit; 610 VHrq setting unit; 700 converter command generation unit; 710 voltage adjustment control unit; 720 power upper limit value setting unit; 730 power lower limit value setting unit; 750 traveling pattern prediction unit; CH smoothing capacitor, CW, CWa, CWb carrier wave; D1-D4 antiparallel diode; Da, Db, Dc duty ratio; Dfba, Dfbb FB control amount; Dffa, Dffb FF control amount; Fcr, Fpl flag; Fvb voltage adjustment flag; Ia, Ib electric current (DC power supply); Ia*, Ib* current command value; L1, L2 reactor; MD mode selection signal; N1-N3 node; PT1, PT2 traveling pattern; PH total electric power; Pa*, Pb* power command value; PH* total electric power command value; PHmax, Pamax, Pbmax power upper limit value; PHmin, Pamin, Pbmin power lower limit value; PL load power; Pa, Pb electric power (DC power supply); Pcv converter loss; Pld load loss; Pr circulation power value; Ptl total loss; S1-S4 switching element; SDa, SDb, SDc control pulse signal; SG1-SG4 control signal; Ta, Tb temperature (DC power supply); VH output voltage; VH* voltage command value; VHmax upper limit voltage; VHrq load request voltage; VR1-VR3 voltage range; Va, Vb voltage (DC power supply); k power distribution ratio.

The invention claimed is:

1. A power supply system comprising:
a load;
an electric power line connected to said load;
a plurality of DC power supplies including a first DC power supply and a second DC power supply different in amount of voltage change with respect to input/output of a same amount of energy;
a power converter connected across said plurality of DC power supplies and said electric power line; and
a control device configured to control operation of said power converter,
said power converter including a plurality of switching elements and being configured to control an output voltage on said electric power line by operating with one operation mode being selectively applied among a plurality of operation modes different in a manner of power conversion between said plurality of DC power supplies and said electric power line,
said plurality of operation modes including
a series direct connection mode in which on/off of said plurality of switching elements is kept such that the state where said plurality of DC power supplies are connected in series with said electric power line is maintained, and
a voltage controlling mode of controlling on/off of said plurality of switching elements to control said output voltage in accordance with a voltage command value by DC voltage conversion between at least one of said first and second DC power supplies and said electric power line,
said control device including a voltage adjustment control unit configured to, in said voltage controlling mode, control said DC voltage conversion performed by said power converter so as to execute voltage adjustment control for matching the sum of voltages of said plurality of DC power supplies with said voltage command value.

2. The power supply system according to claim 1, wherein the amount of voltage change in said second DC power supply is larger than the amount of voltage change in said first DC power supply with respect to input/output of the same amount of energy, and
in a case where the sum of voltages of said plurality of DC power supplies is lower than said output voltage, said voltage adjustment control unit executes said voltage adjustment control by controlling said DC voltage conversion performed by said power converter such that said first DC power supply is discharged while said second DC power supply is charged.

3. The power supply system according to claim 2, wherein said control device further includes a mode selection unit configured to, when the difference between the sum of voltages of said plurality of DC power supplies and said output voltage falls below a determination value in said voltage controlling mode, perform switching to said series direct connection mode among said operation mode.

4. The power supply system according to claim 1, wherein the amount of voltage change in said second DC power supply is larger than the amount of voltage change in said first DC power supply with respect to input/output of the same amount of energy, and
in a case where the sum of voltages of said plurality of DC power supplies is higher than said output voltage, said voltage adjustment control unit executes said voltage adjustment control by controlling said DC voltage conversion performed by said power converter such that said second DC power supply is discharged while said first DC power supply is charged.

5. The power supply system according to claim 1, wherein the amount of voltage change in said second DC power supply is larger than the amount of voltage change in said first DC power supply with respect to input/output of the same amount of energy, and in a case where the sum of voltages of said plurality of DC power supplies is lower than said output voltage, when regenerative power is supplied from said load, said voltage adjustment control unit executes said voltage adjustment control by controlling said DC voltage conversion performed by said power converter such that electric power for charging said second DC power supply is higher than electric power for charging said first DC power supply.

6. The power supply system according to claim 1, wherein the amount of voltage change in said second DC power supply is larger than the amount of voltage change in said first DC power supply with respect to input/output of the same amount of energy, and in a case where the sum of voltages of said plurality of DC power supplies is higher than said output voltage, when electric power for powering is supplied to said load, said voltage adjustment control unit executes said voltage adjustment control by controlling said DC voltage conversion performed by said power converter such that electric power discharged from said second DC power supply is higher than electric power discharged from said first DC power supply.

7. The power supply system according to claim 1, wherein said control device further includes a mode selection unit configured to, when the difference between the sum of voltages of said plurality of DC power supplies and said output voltage falls below a determination value in said voltage controlling mode, perform switching to said series direct connection mode among said operation mode.

8. The power supply system according to claim 1, wherein said power supply system is mounted on an electric-powered vehicle, said load includes an electric motor configured to generate vehicle driving force for said electric-powered vehicle, and said voltage adjustment control unit switches between execution and non-execution of said voltage adjustment control in accordance with a traveling situation of said electric-powered vehicle.

9. The power supply system according to claim 8, wherein, in a case where the sum of voltages of said plurality of DC power supplies is higher than said output voltage, said voltage adjustment control unit executes said voltage adjustment control irrespective of the traveling situation of said electric-powered vehicle.

\* \* \* \* \*